United States Patent
Goodwin et al.

(10) Patent No.: US 10,251,222 B2
(45) Date of Patent: Apr. 2, 2019

(54) DOUBLE-SIDED FLAT INDUCTOR ASSEMBLY

(71) Applicant: Inductoheat, Inc., Madison Heights, MI (US)

(72) Inventors: John Aaron Goodwin, Berkley, MI (US); Valery I. Rudnev, Rochester Hills, MI (US)

(73) Assignee: Inductoheat, Inc., Madison Heights, MI (US)

( * ) Notice: Subject to any disclaimer, the term of this patent is extended or adjusted under 35 U.S.C. 154(b) by 519 days.

(21) Appl. No.: 14/661,736

(22) Filed: Mar. 18, 2015

(65) Prior Publication Data

US 2015/0271875 A1 Sep. 24, 2015

Related U.S. Application Data

(60) Provisional application No. 61/968,657, filed on Mar. 21, 2014.

(51) Int. Cl.
| | |
|---|---|
| *H05B 6/10* | (2006.01) |
| *H05B 6/36* | (2006.01) |
| *H05B 6/44* | (2006.01) |
| *H05B 6/06* | (2006.01) |

(52) U.S. Cl.
CPC .............. *H05B 6/44* (2013.01); *H05B 6/06* (2013.01); *H05B 6/101* (2013.01); *H05B 6/362* (2013.01)

(58) Field of Classification Search
CPC .......... H05B 6/44; H05B 6/101; H05B 6/362
USPC ................................................ 219/671, 676
See application file for complete search history.

(56) References Cited

U.S. PATENT DOCUMENTS

| | | | |
|---|---|---|---|
| 2,647,200 A | 7/1953 | Redmond | |
| 2,866,880 A | 12/1958 | Miller | |
| 3,892,938 A * | 7/1975 | Defosse | H05B 6/30 219/676 |
| 4,661,668 A * | 4/1987 | Mullane | H01M 2/24 219/617 |
| 5,410,134 A | 4/1995 | Marcut et al. | |
| 5,523,546 A | 6/1996 | Lake | |
| 5,680,693 A | 10/1997 | Griebel et al. | |
| 6,637,642 B1 | 10/2003 | Lingnau | |
| 6,825,450 B2 | 11/2004 | Ribeiro et al. | |
| 7,005,620 B2 | 2/2006 | Ribeiro et al. | |
| 7,786,414 B2 | 8/2010 | Schilling et al. | |
| 7,931,184 B2 | 4/2011 | Lingnau et al. | |
| 8,336,755 B2 | 12/2012 | Bray et al. | |
| 2004/0149739 A1 | 8/2004 | Ribeiro et al. | |
| 2006/0124632 A1 | 6/2006 | Stuehr et al. | |

(Continued)

FOREIGN PATENT DOCUMENTS

KR 10-2007-0107731 A 11/2007

*Primary Examiner* — Ibrahime A Abraham
*Assistant Examiner* — John J Norton
(74) *Attorney, Agent, or Firm* — Philip O. Post

(57) ABSTRACT

A double-sided flat inductor assembly is provided for simultaneous induction heating of two separate workpieces positioned on opposing sides of the double-sided flat inductor assembly. A double-sided flat inductor extraction assembly is provided for rapid removal of the inductor assembly after completion of the simultaneous induction heating of the two separate workpieces eliminating a necessity of using flexible electrical cables and allowing improved performance of an induction system including increased reliability.

7 Claims, 26 Drawing Sheets

(56) References Cited

U.S. PATENT DOCUMENTS

2006/0289493 A1 12/2006 Thomas et al.
2014/0042151 A1 2/2014 Tonomura et al.

* cited by examiner

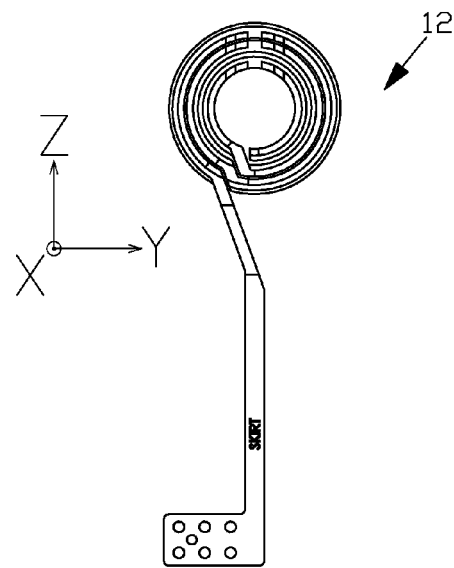 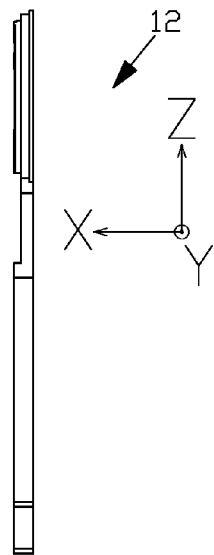
FIG. 12(a)  FIG. 12(b)
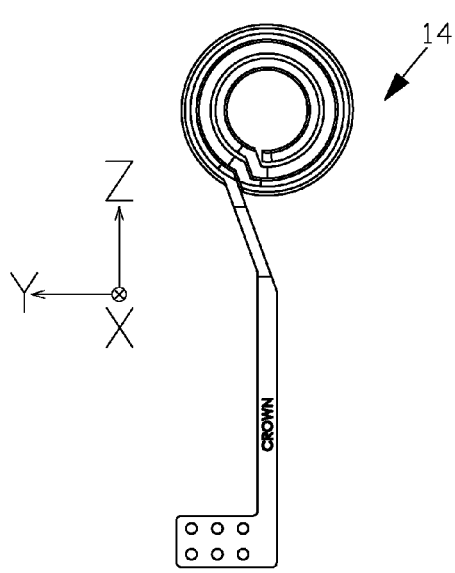 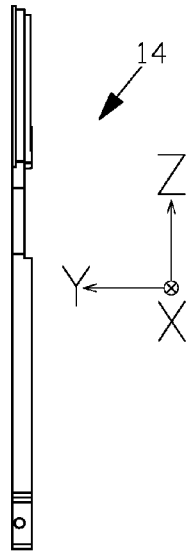
FIG. 12(c)  FIG. 12(d)

DOUBLE-SIDED FLAT INDUCTOR ASSEMBLY

CROSS REFERENCE TO RELATED APPLICATIONS

This application claims the benefit of U.S. Provisional Application No. 61/968,657, filed Mar. 21, 2014, hereby incorporated by reference in its entirety.

FIELD OF THE INVENTION

The present invention relates to double-sided flat inductor assemblies for simultaneous induction heating of two separate workpieces positioned on opposing sides of the inductor assembly.

BACKGROUND OF THE INVENTION

It is advantageous in some manufacturing processes to simultaneously heat by electric induction two separate workpieces that, for example, may be different from each other and are joined together after heating.

One example of such manufacturing processes is disclosed in U.S. Pat. No. 6,825,450 B2 (Ribeiro et al.) where the two separate workpieces are an upper crown part of a piston and the second part is the lower crown part of a piston that complements the upper part and when joined together form the piston. The upper crown part may also be called the crown and the lower crown part may also be called the skirt. The complementary sides of the upper and lower crown parts are first heated, for example, by electric induction, and then joined together, for example, by simultaneously pushing and twisting the complementary sides of the upper and lower crown parts together. U.S. Pat. No. 6,637,642 B1 (Lingnau) describes one such joining process. It is advantageous to heat the upper and lower crown parts simultaneously to provide similar heating profiles in both the upper and lower crown parts for the subsequent welding process that joins the upper and lower crown parts together.

It is one object of the present invention to provide a double-sided flat inductor assembly for simultaneous induction heating of two separate workpieces in a manufacturing process.

It is another object of the present invention to provide a double-sided flat inductor assembly for simultaneous induction heating of complementary sides, or faces of two separate workpieces in a manufacturing process and rapid withdrawal of the inductor assembly away from complementary sides of the two separate workpieces to facilitate joining of the heated complementary sides.

BRIEF SUMMARY OF THE INVENTION

In one aspect the present invention is a double-sided flat inductor assembly for simultaneous induction heating of two separate workpieces when the double-sided flat inductor assembly is positioned between two separate workpieces.

In another aspect the present invention is a double-sided flat inductor assembly for simultaneous induction heating of two separate workpieces when the double-sided flat inductor assembly is positioned between two separate workpieces and an apparatus and method of inserting and extracting the double-sided flat inductor assembly between the two separate workpieces.

In another aspect of the present invention is a high speed inductor extraction apparatus and method for positioning an inductor between a workpiece induction heating position and a workpiece non-interference position.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth herein.

FIG. 12(a) and FIG. 12(b) illustrate one example of a first workpiece inductor used in one example of the present invention.

FIG. 12(c) and FIG. 12(d) illustrate one example of a second workpiece inductor used in one example of the present invention.

DETAILED DESCRIPTION OF THE INVENTION

Figure 1:
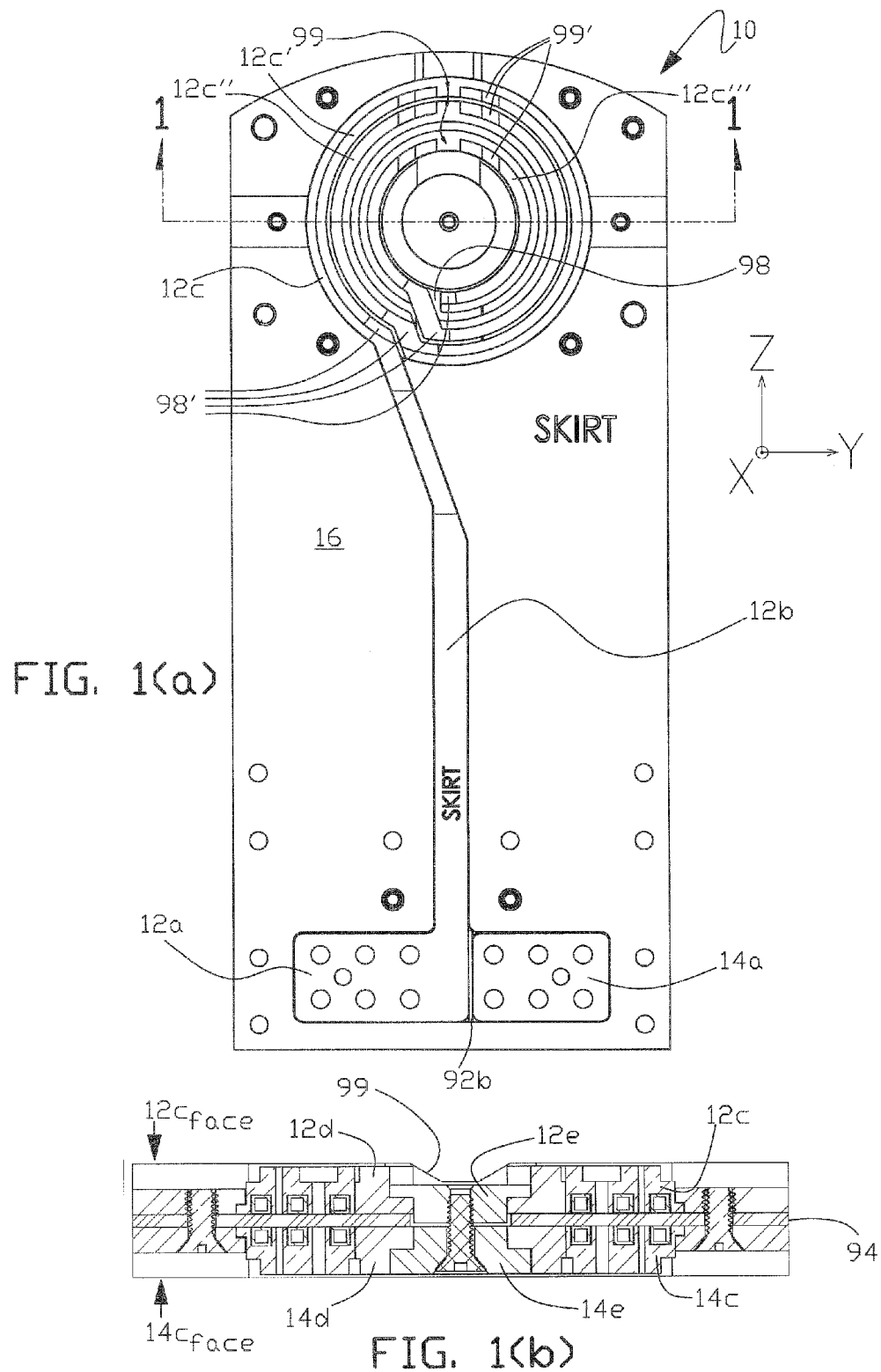
FIG. 1(a) is a side elevational view of a first workpiece side of one example of a double-sided flat inductor assembly of the present invention.
FIG. 1(b) is a cross sectional view of the doubled-sided flat inductor assembly through line 1-1 in FIG. 1(a).

FIG. 1(a) through FIG. 12(d) illustrate one embodiment of a double-sided flat inductor assembly 10 of the present invention comprising first workpiece inductor 12 and second workpiece inductor 14 respectively mounted in first inductor frame 16 and second inductor frame 18. For convenience first workpiece 90a in this example is also referred to as the skirt and the first workpiece inductor frame 16 is correspondingly labeled "SKIRT" in some of the figures. Similarly the second workpiece 90b in this example is also referred to as the crown and the second workpiece inductor frame 18 is correspondingly labeled "CROWN" in some of the figures. The inductor frames are configured as required for use in a particular application and represented in the figures in one embodiment.

As shown in one embodiment of the invention, first workpiece inductor 12 comprises a first inductor terminal section 12a (also referred to as skirt inductor foot 12a), first inductor riser section 12b (also referred to as skirt inductor leg 12b) and first inductor coil section 12c (also referred to as skirt coil 12c).

As shown in one embodiment of the invention, second workpiece inductor 14 comprises a second inductor terminal section 14a (also referred to as crown inductor foot 14a), second inductor riser section 14b (also referred to as crown inductor leg 14b) and second inductor coil section 14c (also referred to as crown coil 14c).

The first inductor riser section and the second inductor riser section are optional in other embodiments and are a means for electrically interconnecting the first inductor coil section to the first inductor terminal section, and the second inductor coil section to the second inductor terminal section, respectively, if there is a requirement to physically separate the inductor coil sections from the inductor terminal sections.

In this embodiment of the invention first and second inductor coil sections 12c and 14c are each shaped as a spirally-coiled induction coil (or inductor) that is sometimes referred to as a "pancake" coil. The spacing between turns of the spirally-coiled inductor may vary based upon the workpiece geometry being heat treated. For example symmetric spacing between all turns of the coil can result in an electromagnetic ring effect where stronger magnetic fields occur on the inner radial region of the workpiece face being heat treated compared with the outer radial regions. To compensate in some embodiments of the invention the outer turns may be more closely spaced together than the inner turns. For example in FIG. 1(a) the two outer turns of the first inductor coil sections 12c' and 12c'' are more closely spaced together, and separated further apart from the single inner coil turn 12c''' to provide a more uniform induction heating across the surface (or face) of the workpiece with reduced sensitivity in coil position relative to the surface of the workpiece. In other embodiments of the invention other coil turn arrangements can be provided to compensate for selected regions of the first or second workpiece in a particular application.

Generally the first inductor coil section and the second inductor coil section, as disclosed herein, can be referred to as planarly oriented coil section with the two planarly oriented coil sections being planarly disposed opposing each other. Deviations from planar, for example, the profiling described herein are within the terminology of a planarly oriented coil section. While the embodiment of the inductor coil sections shown in the drawings is circular other configurations can be used in other embodiments of the invention. In other embodiments the entire first workpiece inductor and the entire second workpiece inductor can be referred to as planarly oriented inductors with the two planarly oriented inductors being planarly disposed opposing each other.

First and second workpiece inductors are suitably joined together electrically, for example, by brazing to form a series electrical circuit between the first and second inductor terminal sections 12a and 14a. First workpiece inductor 12 and second workpiece inductor 14 are connected electrically in series as diagrammatically shown in FIG. 16 for orientation of electrical current through the inductors that allows magnetic fluxes generated by each inductor to complement each other rather than allowing maximum density of alternating current electrical current density to shift towards respected turns of the two inductors that results in a dramatic reduction of heating efficiency of respected areas of the first (skirt) workpiece 90a and the second (crown) workpiece 90b.

Figure 6:
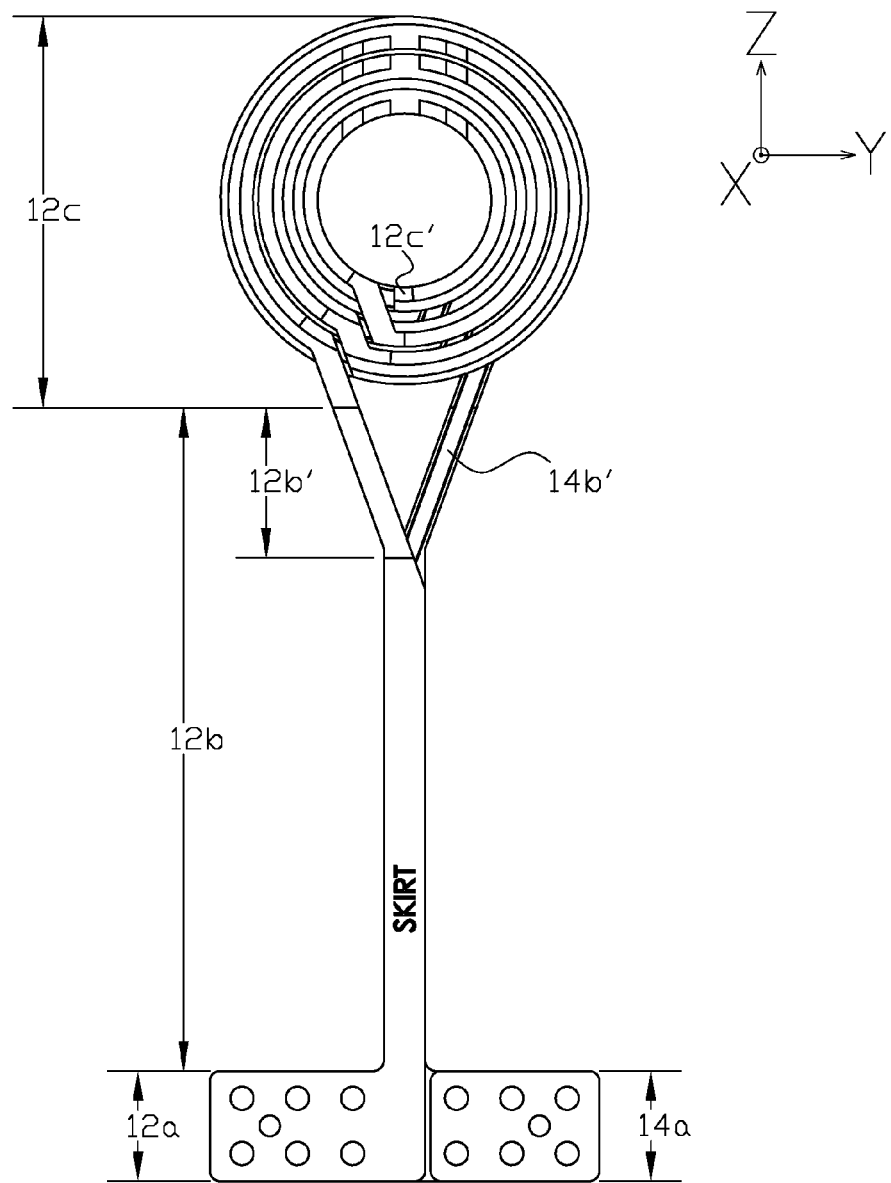
FIG. 6 is a side elevational view of one example of a first workpiece inductor removed from an inductor frame of a double-sided flat inductor assembly of the present invention with the second workpiece inductor positioned behind the first workpiece inductor.

As shown in FIG. 6 first inductor riser section 12b includes riser-coil interface subsection 12b'. Similarly in FIG. 8 second inductor riser section 14b includes riser-coil interface subsection 14b'. In this embodiment of the invention crown inductor foot 14a is preferably flush with the outer surface of skirt inductor foot 12a on the SKIRT side of the inductor assembly to facilitate connections to a single phase alternating current source (not shown in the figures) in some embodiments of the invention.

Figure 7:
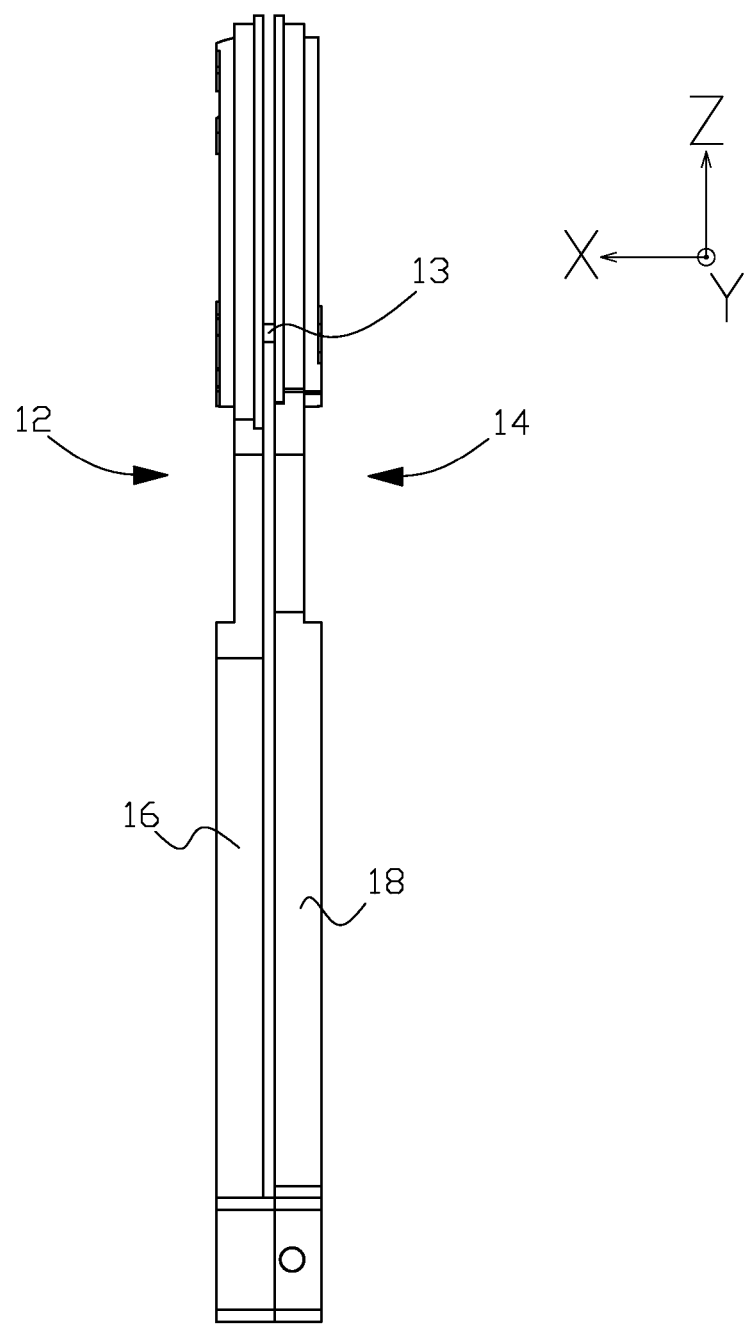
FIG. 7 is an end elevational view of one example of first and second workpiece inductors removed from their inductor frames.
Figure 8:
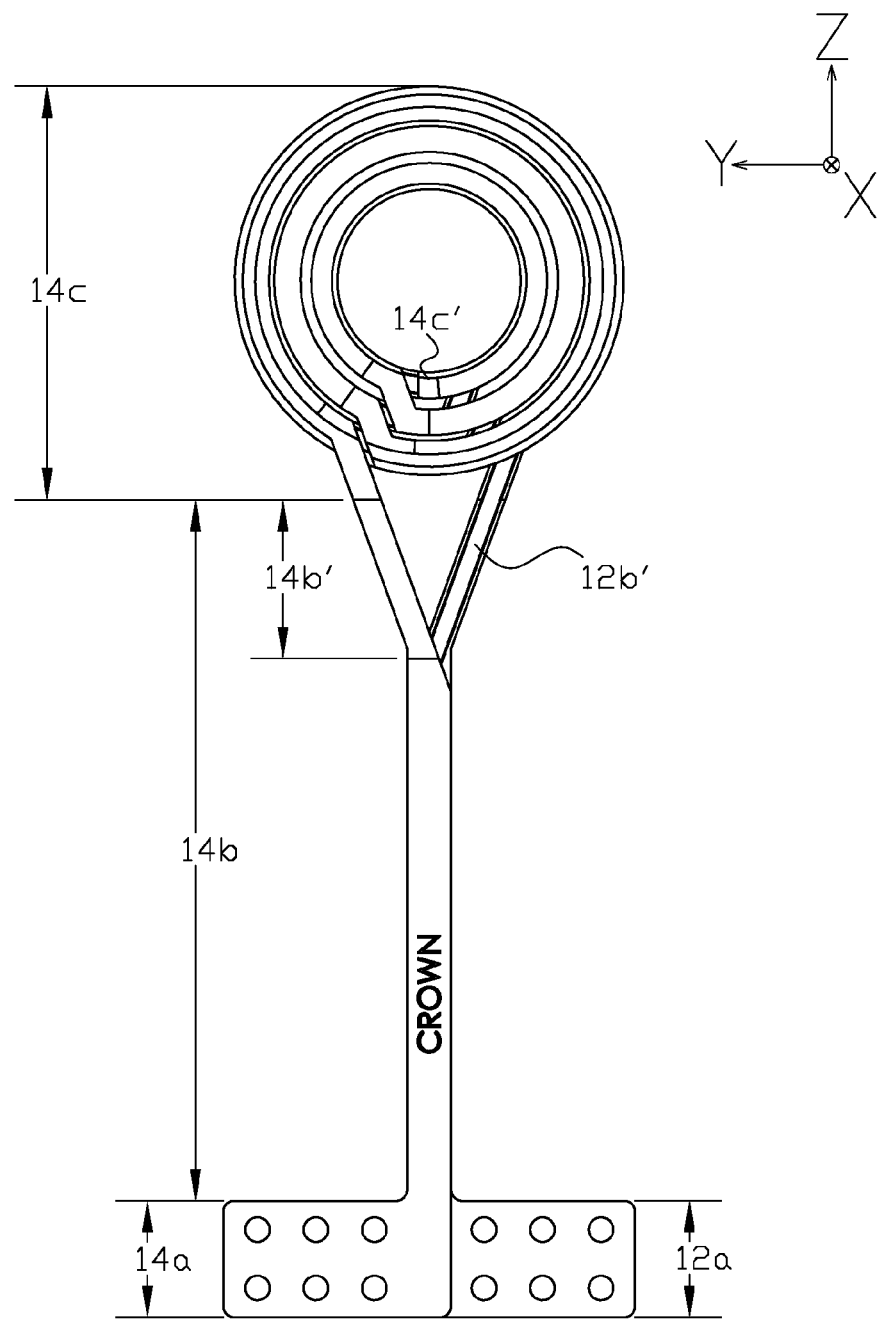
FIG. 8 is a side elevational view of one example of a second workpiece inductor removed from an inductor frame of a double-sided flat inductor assembly of the present invention with the first workpiece inductor positioned behind the second workpiece inductor.

In this embodiment of the invention the inner coil terminus 12c' of skirt coil 12c is electrically connected to the inner coil terminus 14c' of crown coil 14c as shown in FIGS. 6, 7 and 8 by electrical connecting element 13, which as mentioned above, can be accomplished by brazing the inner coil termini of the first and second inductor coils to form a series circuit from the skirt inductor 12 and crown inductor 14 between skirt terminal section 12a and crown terminal section 14a, which are connected to the outputs of a suitable single phase alternating current power source. Electrically connecting inner coil terminus 12c' to inner coil terminus 14c' can be accomplished by any suitable means, for example by brazing (that is, forming a brazed joint between the inner coil terminus of the skirt inductor 12 and the inner coil terminus of the crown inductor 14). Alternative means of electrically connecting the two inductor coils in series can be, for example, an electrical conductor suitably connected between the inner coil termini or other coil termini for other inductor coil arrangements.

Suitable middle electrical insulating material 94, for example formed from TEFLON®, is positioned as required between: (1) the skirt inductor foot 12a, skirt inductor leg 12b and skirt coil 12c; and (2) the crown inductor foot 14a, crown inductor leg 14b and crown coil 14c to provide a means of electrical isolation between skirt inductor 12 and crown inductor 14. Any other type of insulating material (dielectric), including air, can be used in other embodiments of the invention to provided electrical isolation between the skirt and crown inductor.

In this embodiment of the invention first 16 and second 18 inductor frames are each formed from a non-electrically conductive material such as a phenolic board or a GLASTIC® electrical insulating board.

FIG. 1(b) illustrates in cross section in this embodiment of the invention, inner skirt and crown concentrators 12d and 14d respectively; skirt and crown center plugs 12e and 14e respectively; and skirt and crown coils 12c and 14c respectively. The inner skirt and crown concentrators as shown in FIG. 1(b) provide maximum magnetic intensity on the respective inductor coil section when flush with the heating face ($12c_{face}$ or $14c_{face}$) of the respective inductor coil section's inner turn. If the inner face of a particular workpiece surface to be heat treated is too hot, the inner concentrators can be repositioned or re-sized to reduce the heating efficiency of the inner turn of the inductor coil section to provide a means of controlling the induction heating process that can rectify heating imbalance between the radial inner and outer workpiece faces. For example one or more of the L-shaped concentrators used in this embodiment can have the top of an L-shaped concentrator shortened adjacent to its respective heating face to selectively reduce the magnetic intensity for a particular induction heating application. In other embodiments of the invention the concentrators can be other than L-shaped to suit a particular induction heating application.

Figure 3A:
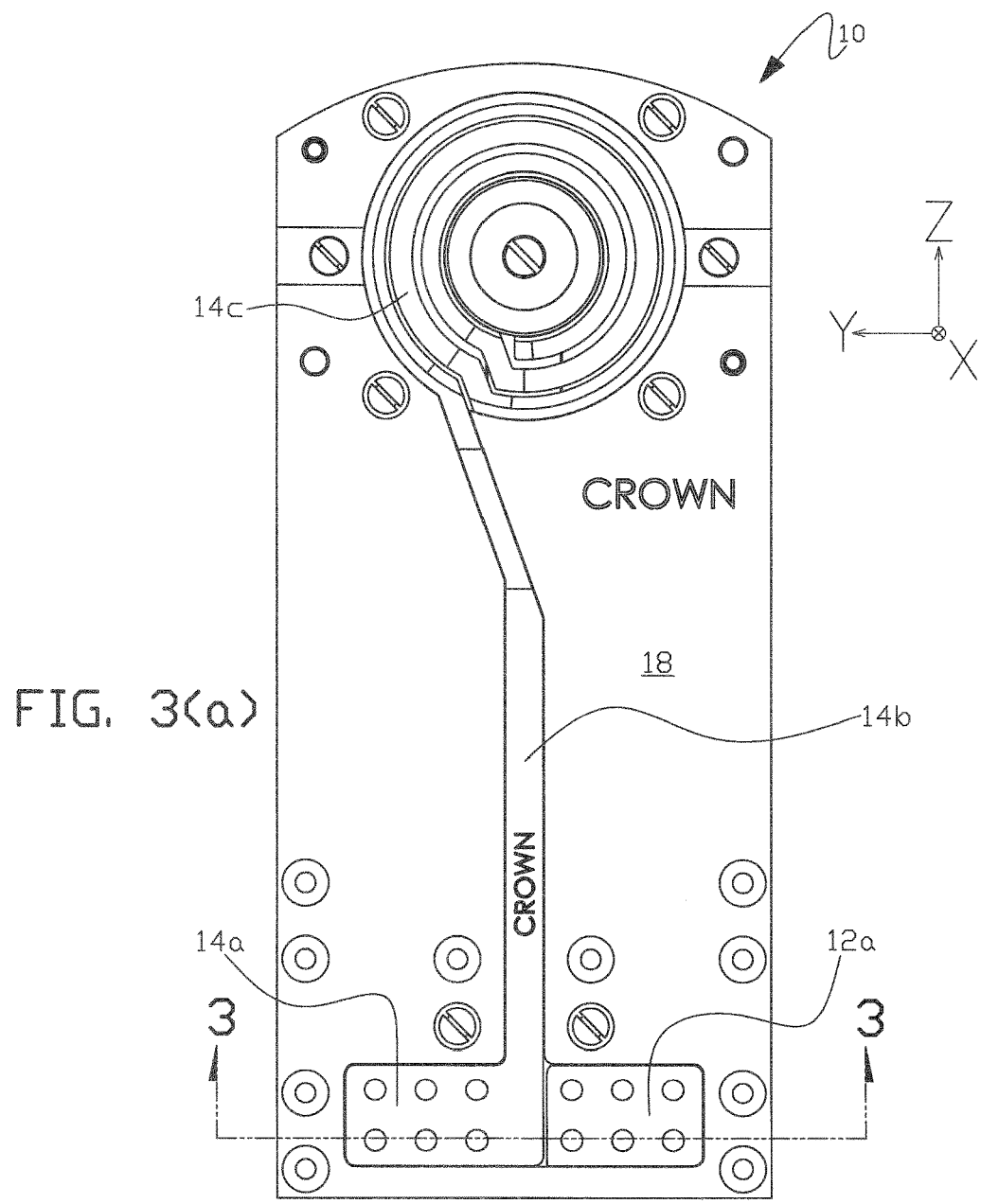
FIG. 3(a) is a side elevational view of a second workpiece side of one example of a double-sided flat inductor assembly of the present invention.
Figure 3B:
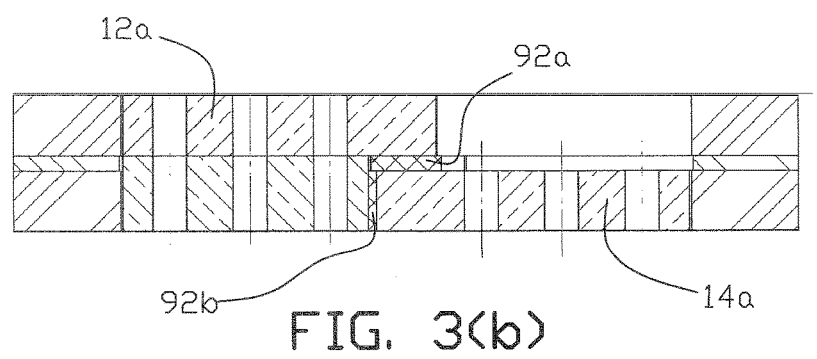
FIG. 3(b) is a cross sectional view of the doubled-sided flat inductor assembly through line 3-3 in FIG. 3(a).
Figure 9:
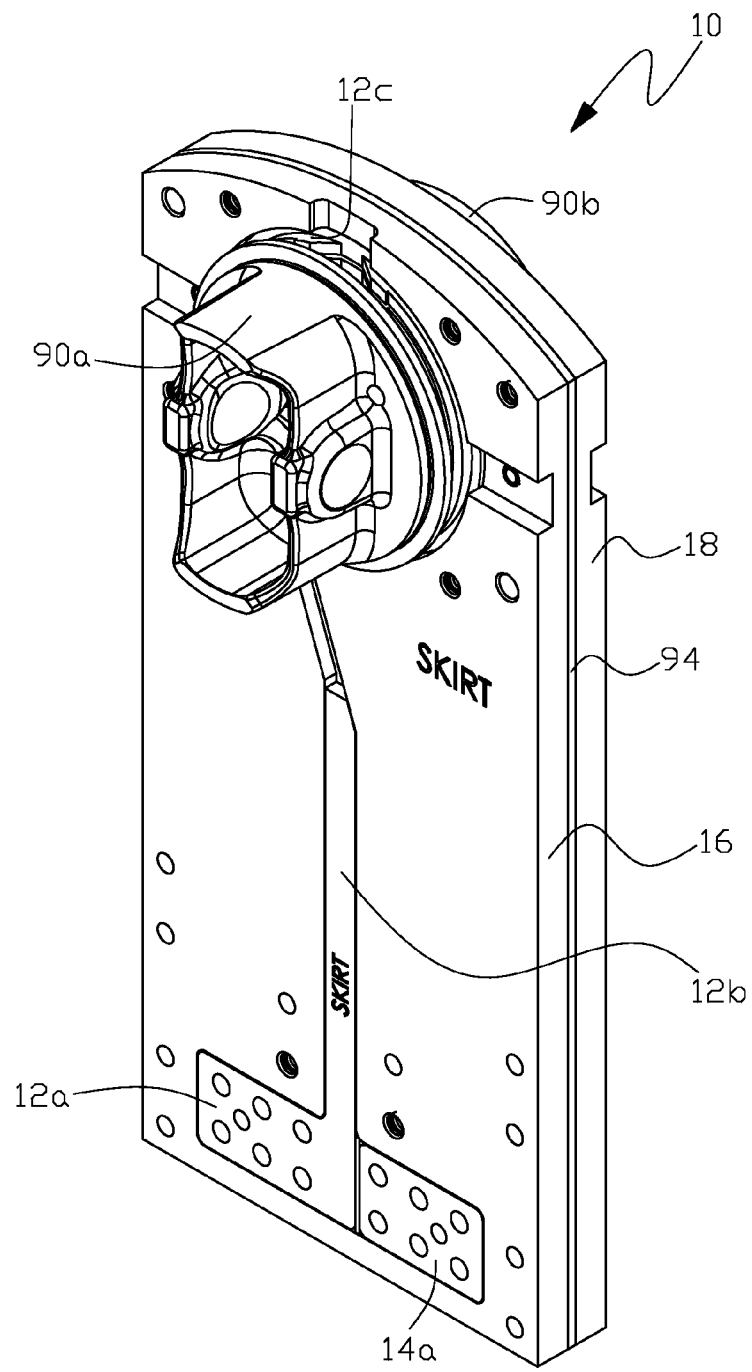
FIG. 9 is the side perspective view of the first workpiece side of the double-sided flat inductor assembly shown in FIG. 2 with a first workpiece positioned adjacent to a face of the first workpiece inductor for induction heating.
Figure 10:
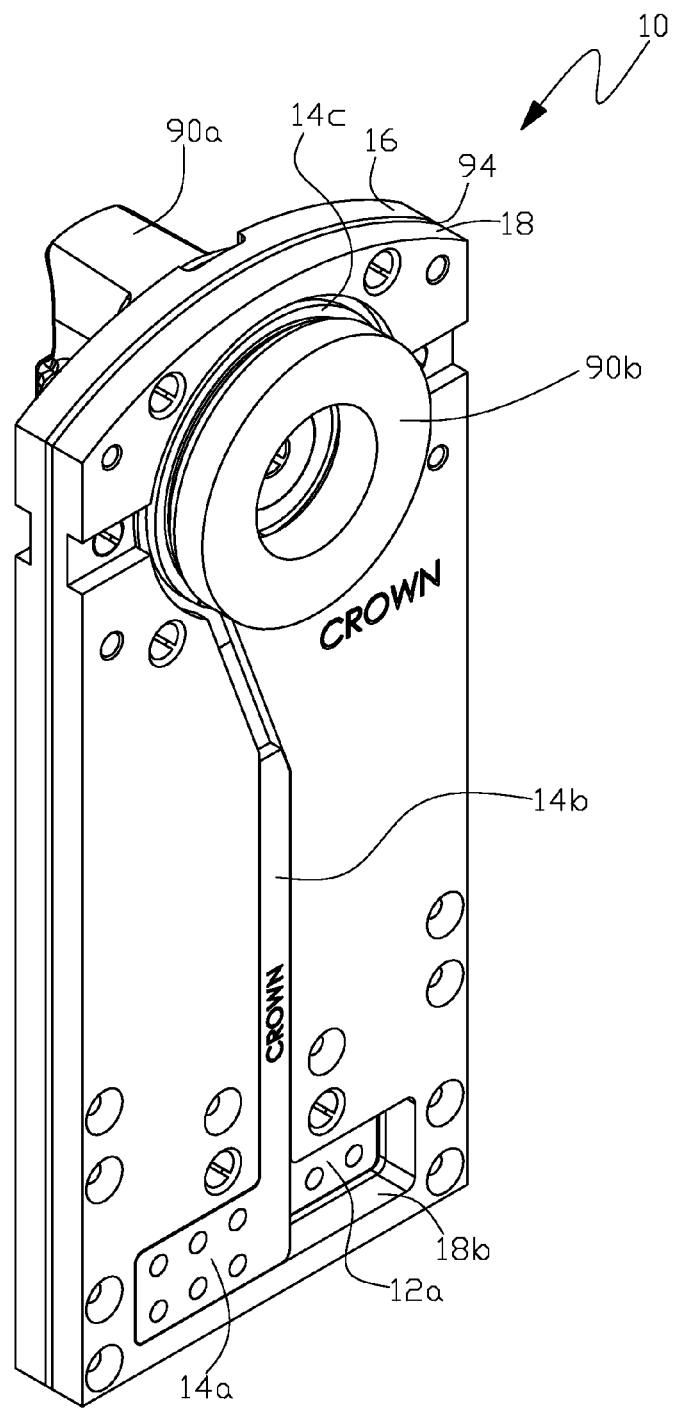
FIG. 10 is the side perspective view of the second workpiece side of the double-sided flat inductor assembly shown in FIG. 4 with a second workpiece positioned adjacent to the face of the second workpiece inductor for induction heating.

FIG. 3(b) illustrates in cross section in this embodiment of the invention, electrical insulating material 92a and 92b electrically separating skirt inductor foot 12a from crown inductor foot 14a. FIG. 9 and FIG. 10 also illustrate how in this embodiment of the invention crown inductor foot 14a is flush with the outer surface of skirt inductor foot 12a on the SKIRT side of the inductor assembly in FIG. 9 to facilitate connections to a single phase alternating current source either directly (not shown in the figure) or via an extraction assembly as described herein while skirt inductor foot 12a does not extend to the crown inductor side as indicated by open space 18b in crown inductor frame 18 in FIG. 10.

Assembly of the first and second workpiece inductors and the first and second inductor frames can be, for example, by bolted (or other suitable fastening means) construction.

Figure 11:
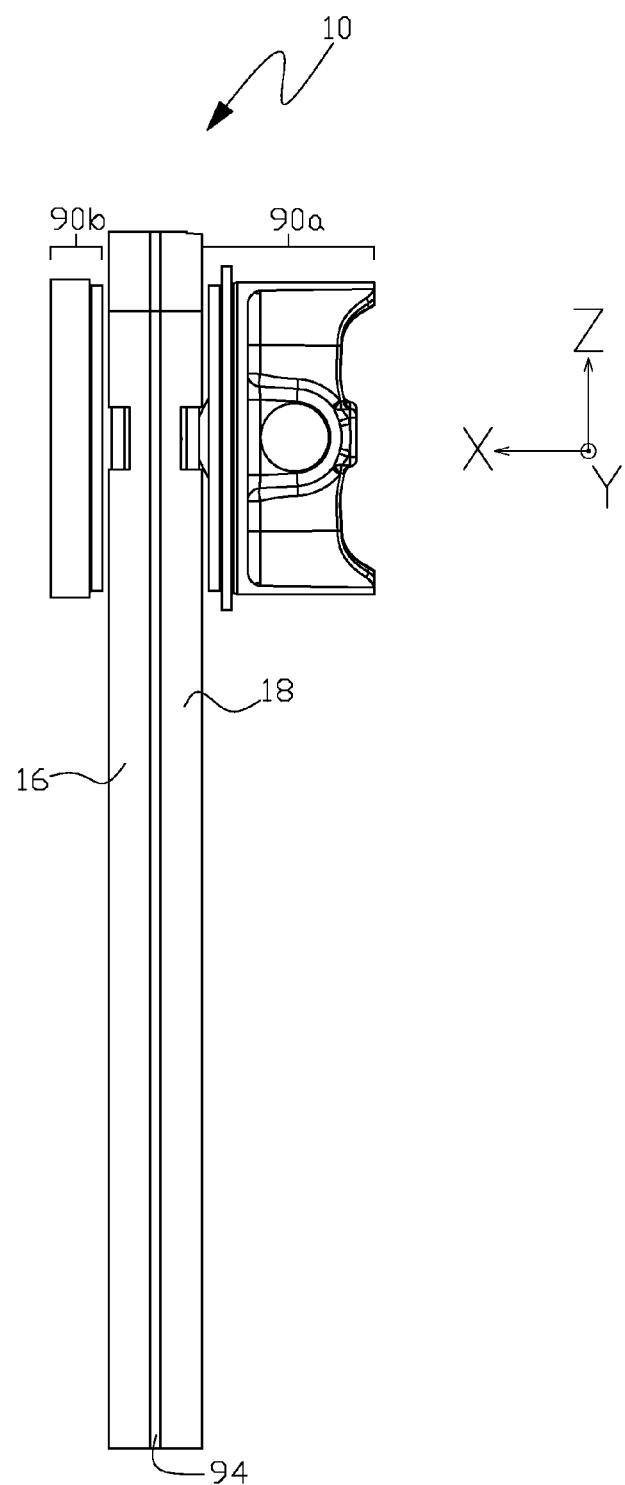
FIG. 11 is an end elevational view of one example of the first and second sides of a double-sided flat inductor assembly with the first and second workpieces respectively positioned adjacent to the faces of the first and second workpiece inductors.

In this embodiment of the invention FIG. 9 and FIG. 10 illustrate first (skirt) workpiece 90a in position over skirt coil 12c for induction heating of the first workpiece 90a simultaneously with the induction heating of the second (crown) workpiece 90b in position over crown coil 14c, and also in end view in FIG. 11 where the recessed skirt coil and crown coil are not visible.

Figure 2:
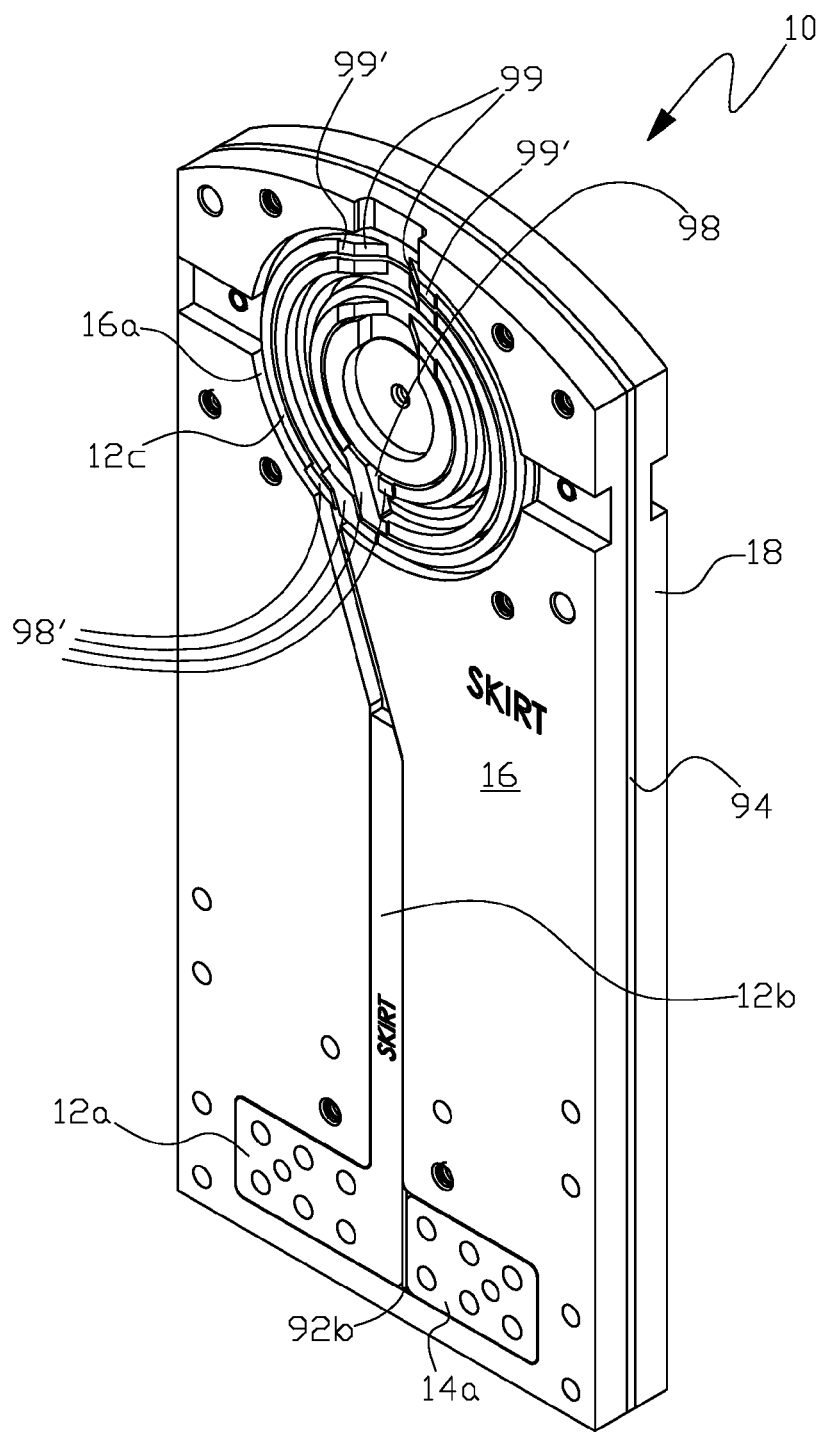
FIG. 2 is a side perspective view of the first workpiece side of the double-sided flat inductor assembly shown in FIG. 1(a).
Figure 4:
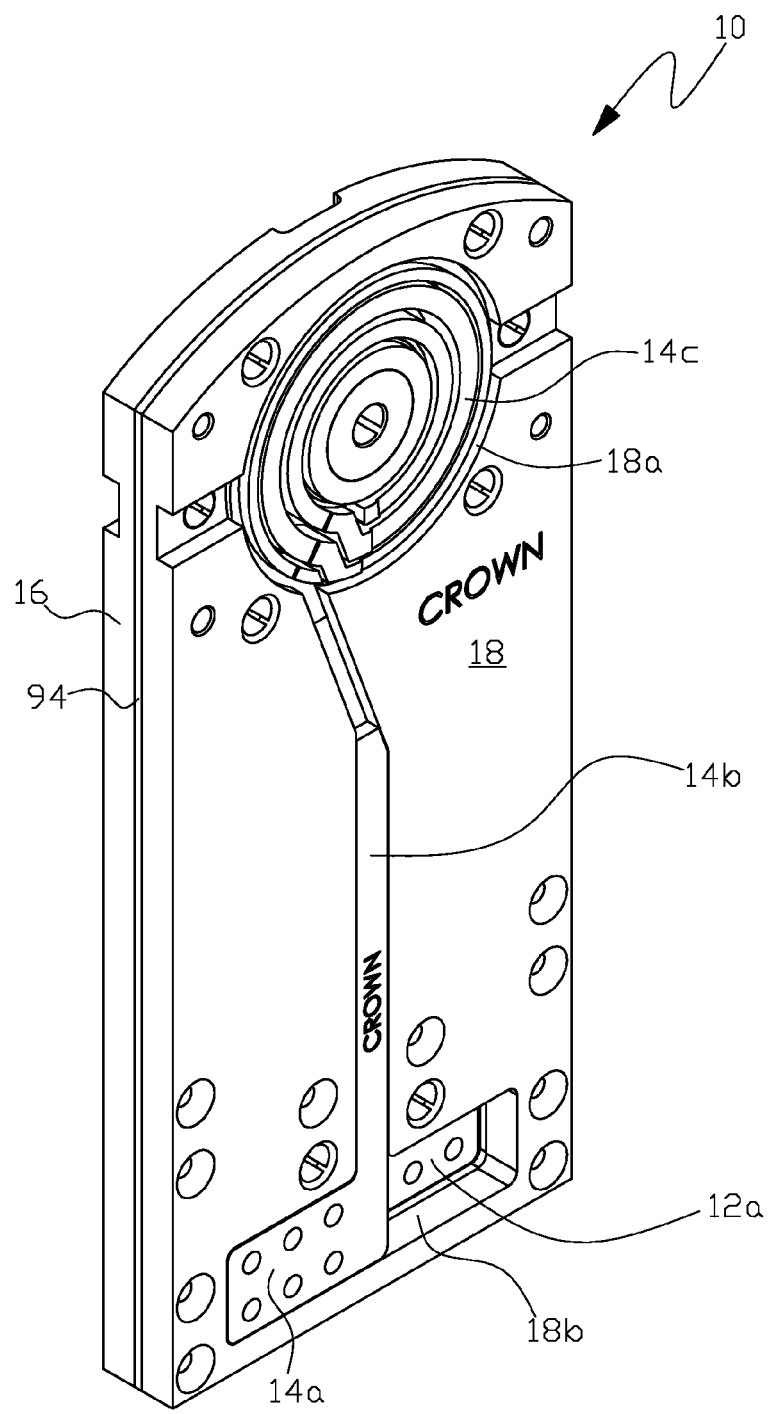
FIG. 4 is a side perspective view of the second workpiece side of the doubled-sided flat inductor assembly shown in FIG. 3(a).
Figure 5:
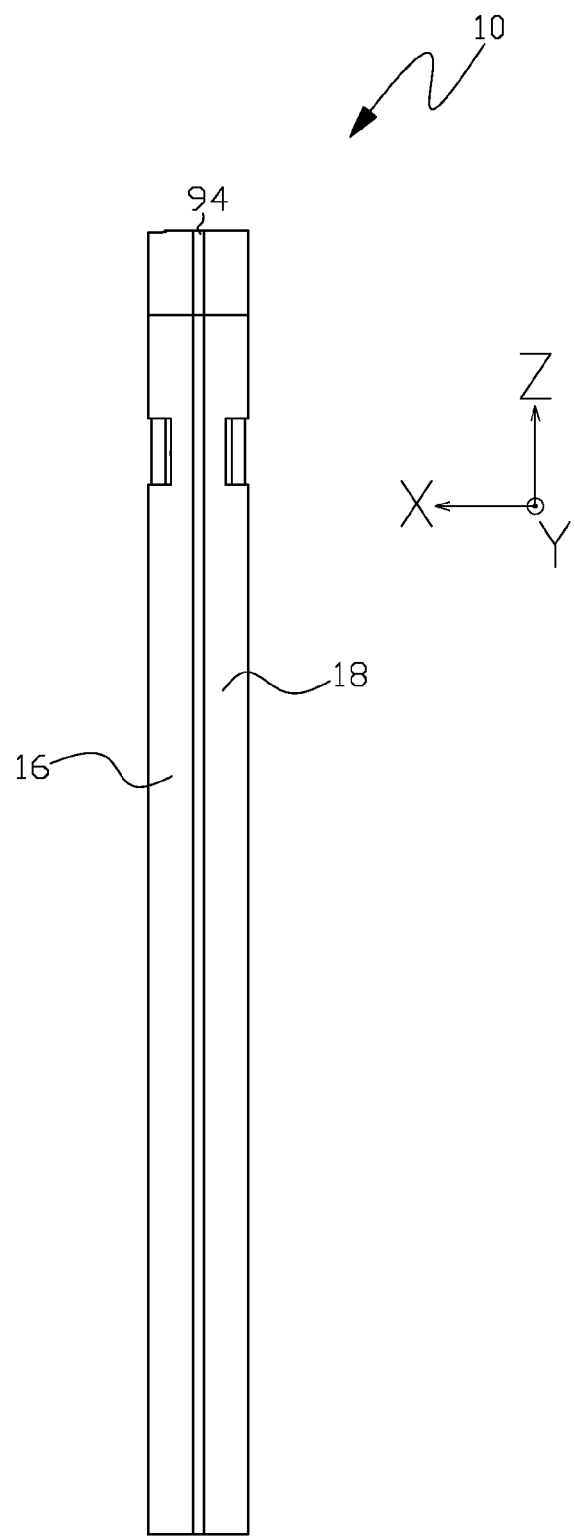
FIG. 5 is an end elevational view of the double-sided flat inductor assembly shown in FIG. 1(a) through FIG. 4.

In this embodiment of the invention skirt inductor coil 12c and crown inductor coil 14c are recessed respectively in skirt inductor frame 16 and crown inductor frame 18 as indicated by frame recess regions 16a and 18a, for example in FIG. 2 and FIG. 4 respectively.

In some applications of the present invention the geometry of either workpiece can be non-uniform and have substantial changes in mass at various radial quadrants of the workpiece. These changes in mass create heat imbalances during heating. To compensate for this, the heating surfaces of the respective inductor coil section can be profiled in angular radial quadrants to form a profiled section or region correlating to the different workpiece quadrants of varying mass. The workpiece must then be placed in the induction heating position at a specified orientation to maintain the desired inductor coil section to workpiece relationship.

Inductor assembly 10 can be connected to an actuator apparatus that moves the inductor assembly into the heat position between the first and second workpieces (shown in FIG. 11) and a retracted position downwards (in the negative Z-direction) so that facing skirt 90a and crown 90b heated surfaces can be simultaneously pushed together (in opposing X-directions) and twisted about the X-axis to join the skirt 90a and crown 90b. Alternatively in other embodiments one of the two workpieces can remain stationary and the other workpiece can be moved to push against the stationary workpiece.

The actuator apparatus is illustrated in one embodiment of the invention in FIG. 13(a) through FIG. 13(d) as double-sided inductor extraction assembly 30. Primary magnetic device 32a is suitably mounted to fixed structure such as primary mounting plate 81 that can be formed from a dielectric. Primary supply electrical conductors 86a and 86b are also mounted to primary mounting plate 81 (via standoff posts 81a in this embodiment). Primary supply electrical conductors are illustrated as bus bars in the example and can be any type of suitable electrical conductors. Power source cables 82a and 82b (three supply and three return cables in this embodiment) from a suitable single phase alternating current source are connected respectively to electrical conductors 86a and 86b. Power source cables can be any type of suitable power source electrical conductors such as bus bars.

Figure 13A:
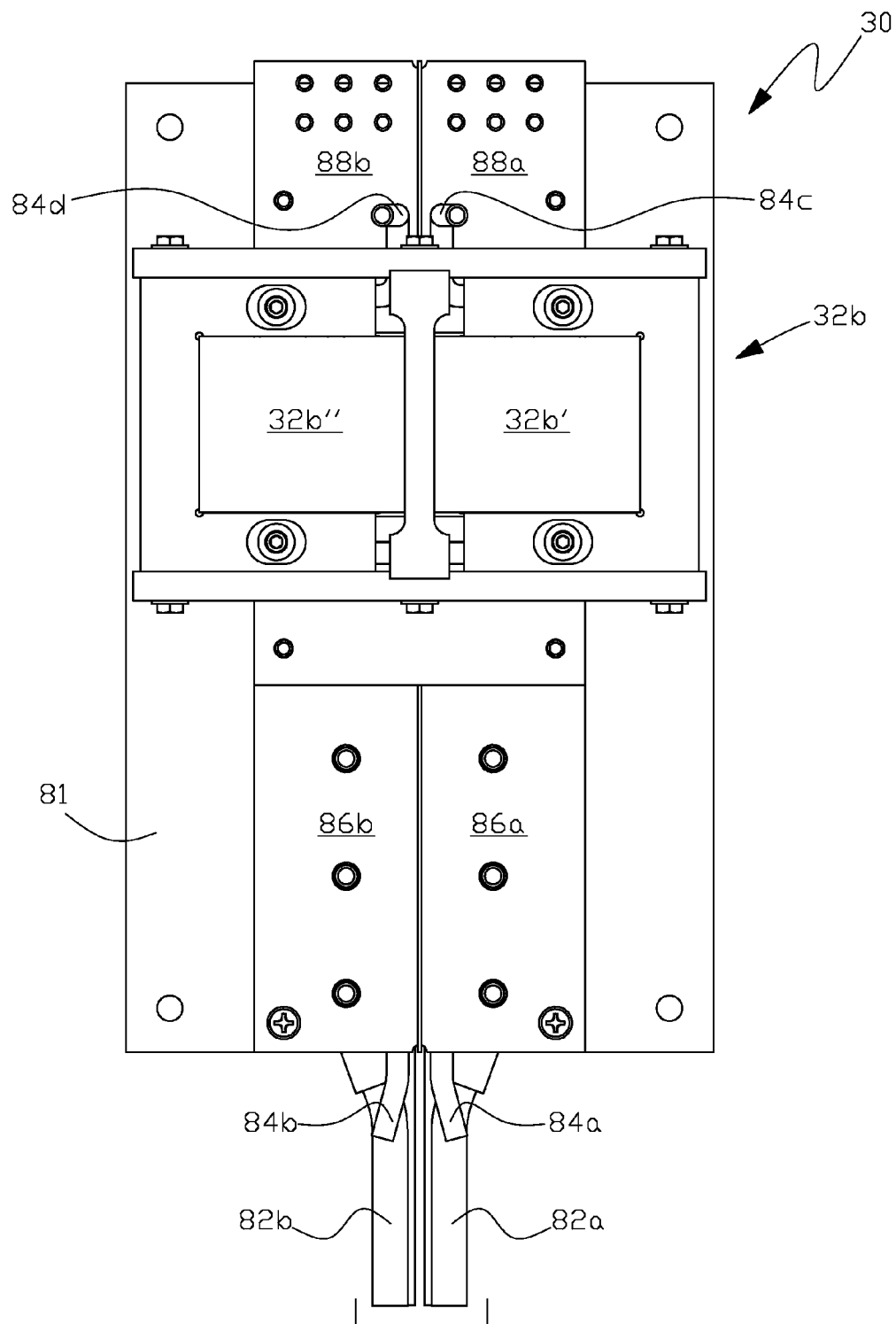
FIG. 13(a) is a front elevational view of one example of a double-sided inductor extraction assembly of the present invention for a double-sided flat inductor assembly.
Figure 13B:
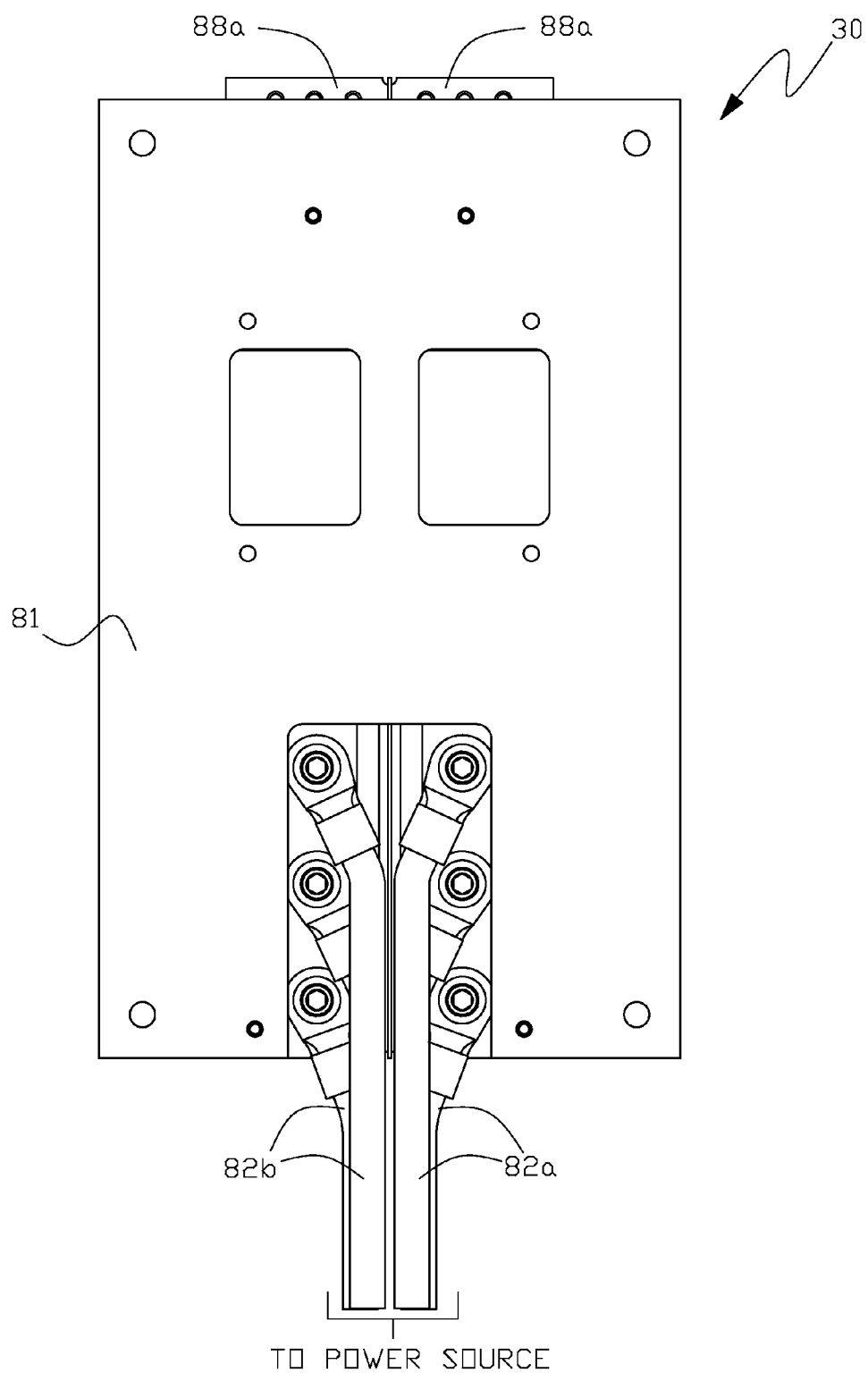
FIG. 13(b) is a rear elevational view of the double-sided inductor extraction assembly shown in FIG. 13(a).
Figure 13C:
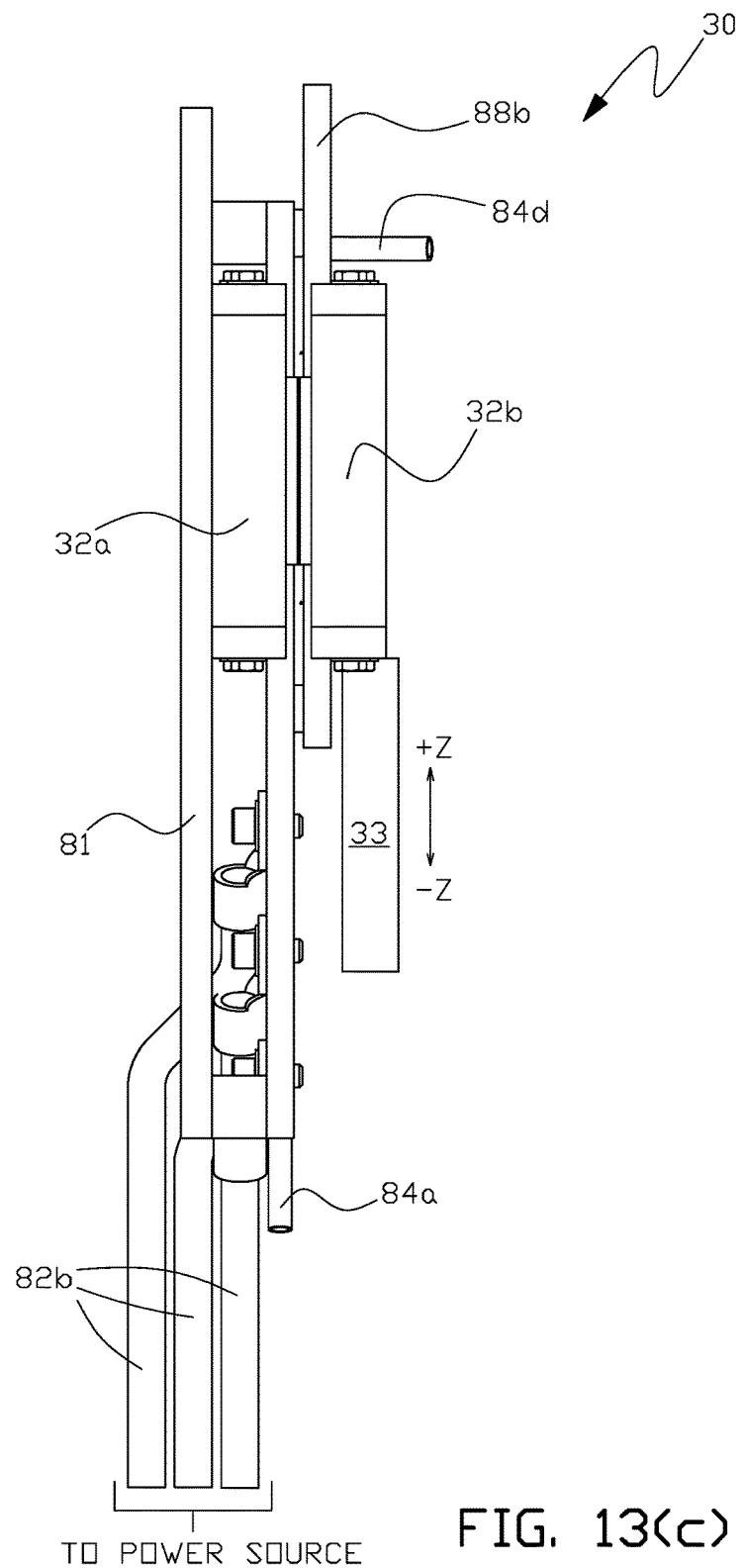
FIG. 13(c) is a side view of the double-sided inductor extraction assembly shown in FIG. 13(a).
Figure 13D:
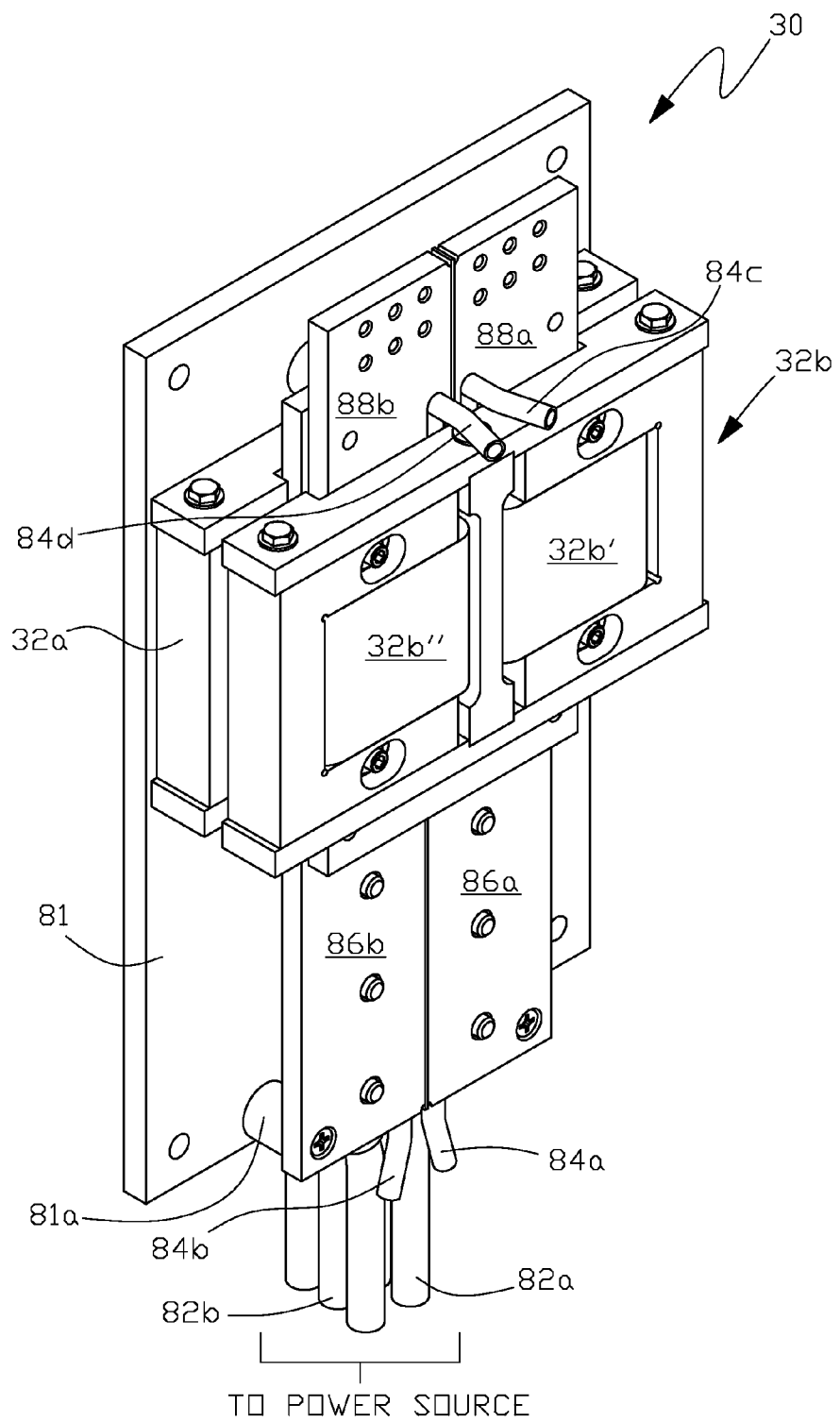
FIG. 13(d) is a front perspective view of the double-sided inductor extraction assembly shown in FIG. 13(a).

Secondary magnetic device 32b is electrically connected to secondary output electrical conductors 88a and 88b. The secondary magnetic device and secondary output electrical conductors are connected to a suitable extraction actuator 33 which in this embodiment moves the secondary magnetic device 32b and secondary output electrical conductors 88a and 88b linearly in the plus or minus Z direction as shown in FIG. 13(c) and further described below. In other embodiments of the invention the extraction movement may be in another linear direction, a rotational direction or a combination of linear and rotational directions.

FIG. 14(a) through FIG. 14(e) illustrate one example of double-sided flat inductor assembly 10 electrically connected to the extraction assembly shown in FIG. 13(a) through FIG. 13(d). In this embodiment first inductor terminal section 12a and second inductor terminal section 14a are connected respectively to electrically conductors 88a and 88b on extraction assembly 30.

Optional cooling fluid medium cables 84a and 84b and 84c and 84d supply and return a cooling fluid medium to the skirt and crown inductors via the extraction assembly in this example.

Figure 14A:
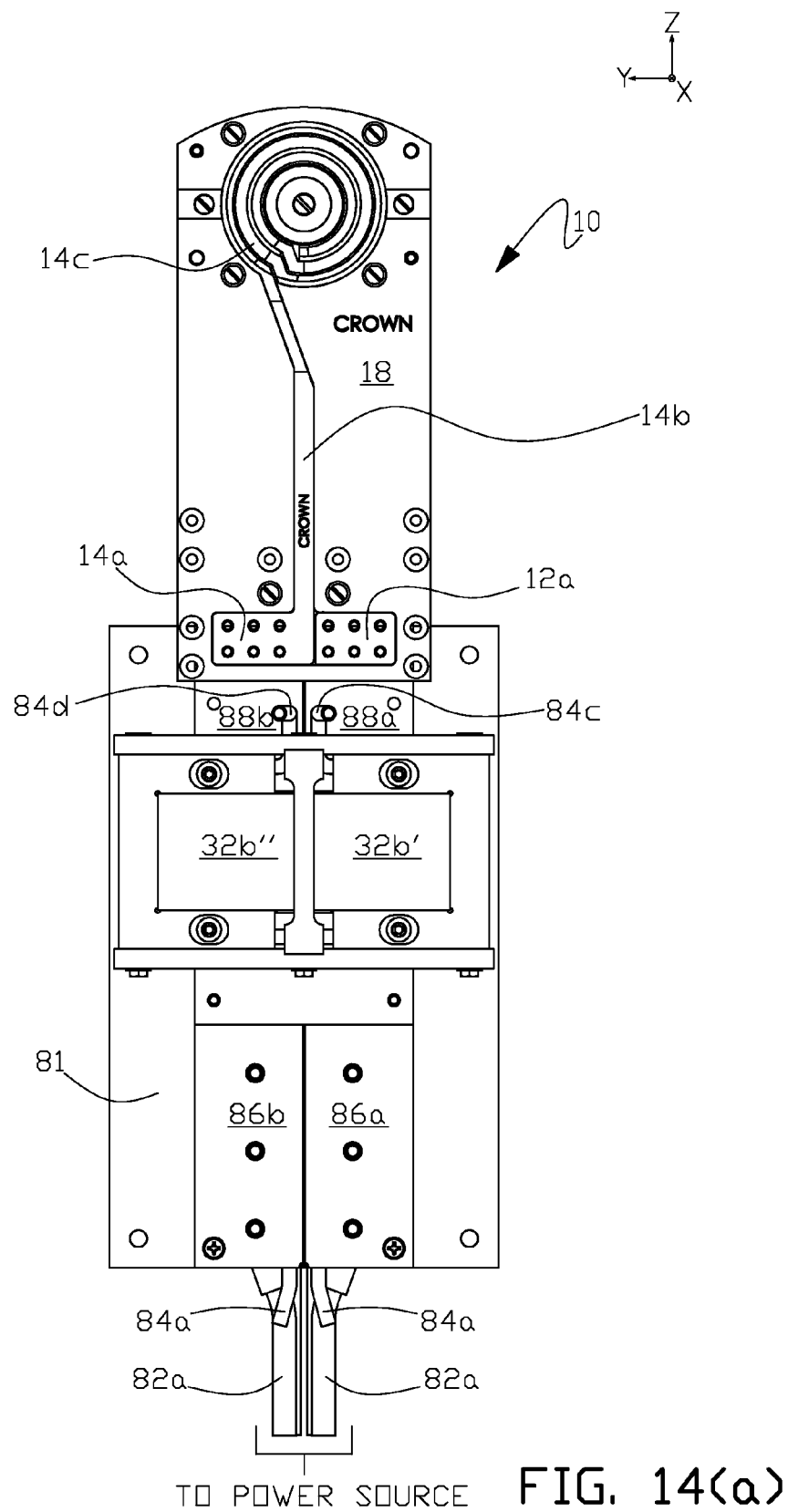
FIG. 14(a) is a front elevational view of one example of a double-sided flat inductor assembly of the present invention attached to the double-sided inductor extraction assembly shown in FIG. 13(a) through 13(d) in the induction heating position.
Figure 14B:
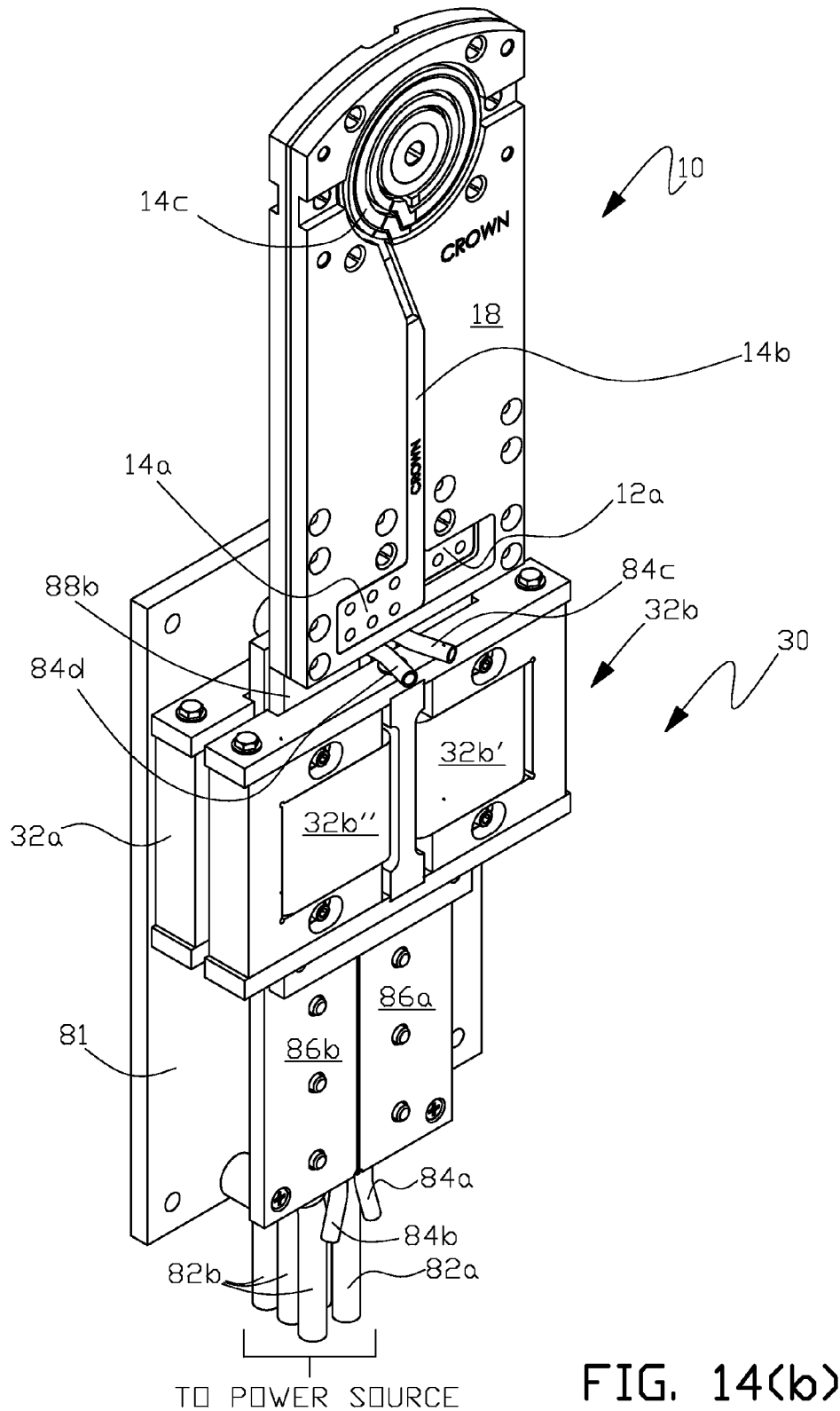
FIG. 14(b) is a front perspective view of the double-sided flat inductor assembly attached to the inductor extraction assembly shown in FIG. 14(a).
Figure 14C:
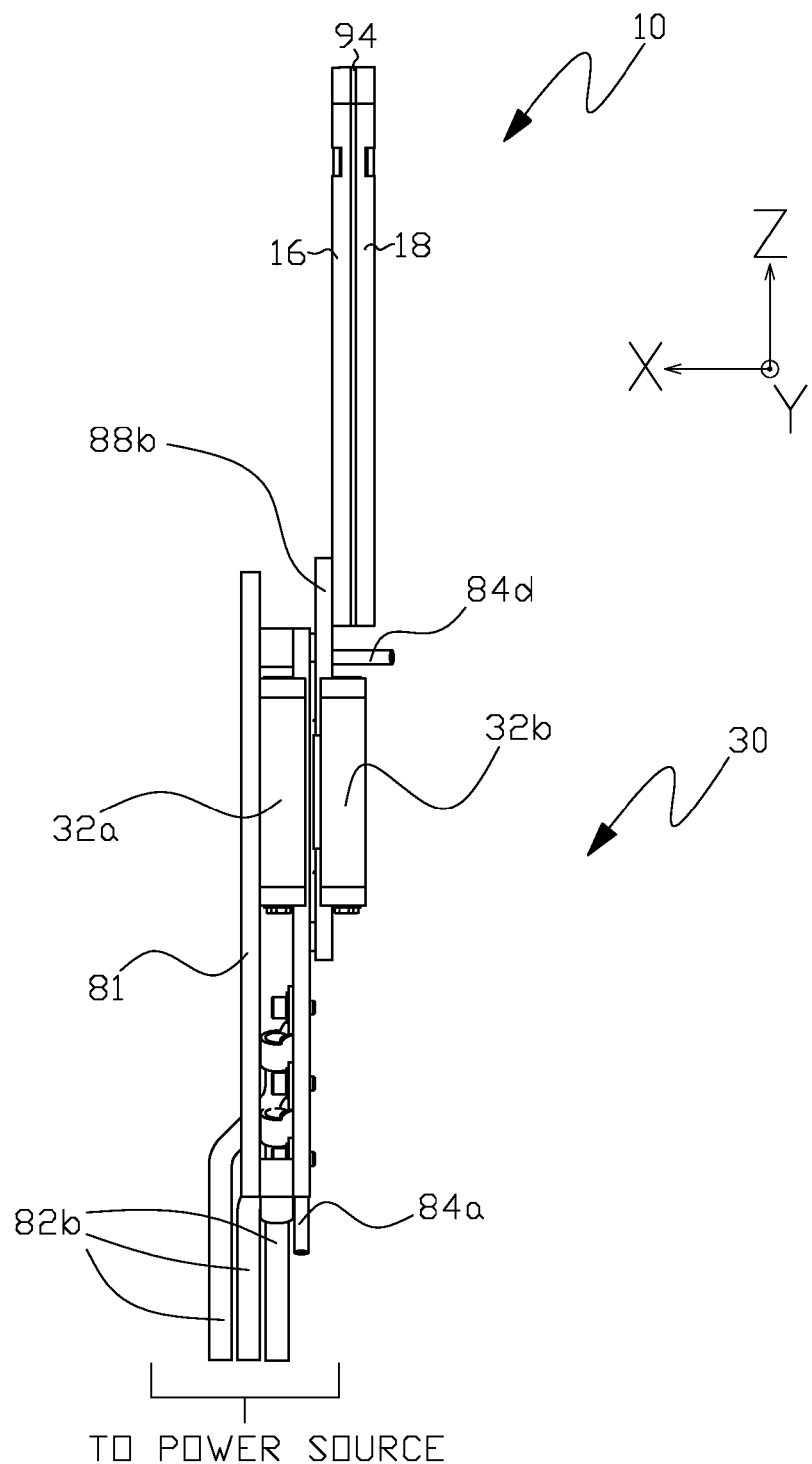
FIG. 14(c) is a side elevational view of the double-sided flat inductor assembly attached to the inductor extraction assembly shown in FIG. 14(a).
Figure 14D:
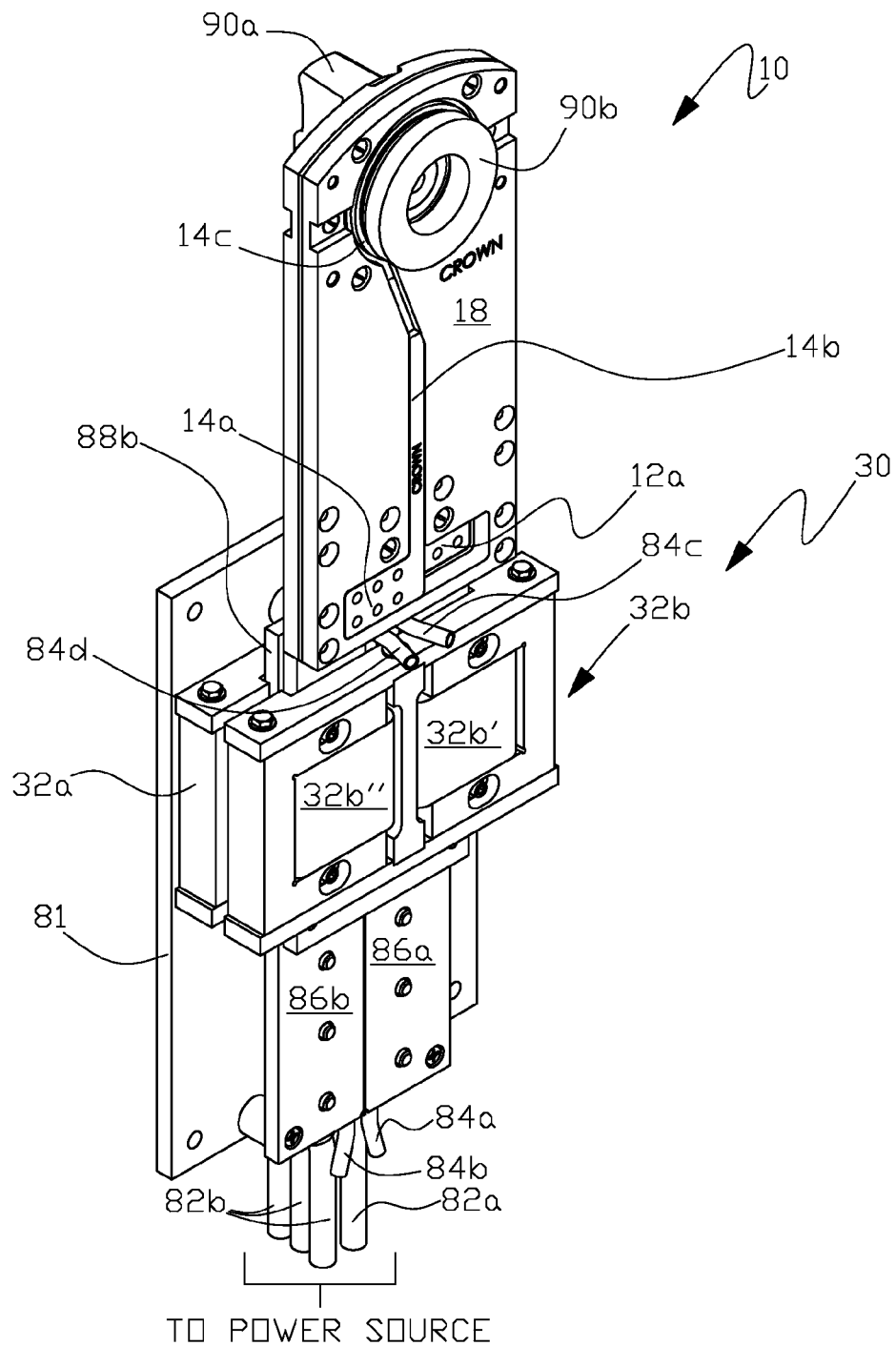
FIG. 14(d) is a front perspective view of the double-sided flat inductor assembly of the present invention attached to the inductor extraction assembly shown in FIG. 14(a) with first and second workpieces in the induction heating position.
Figure 14E:
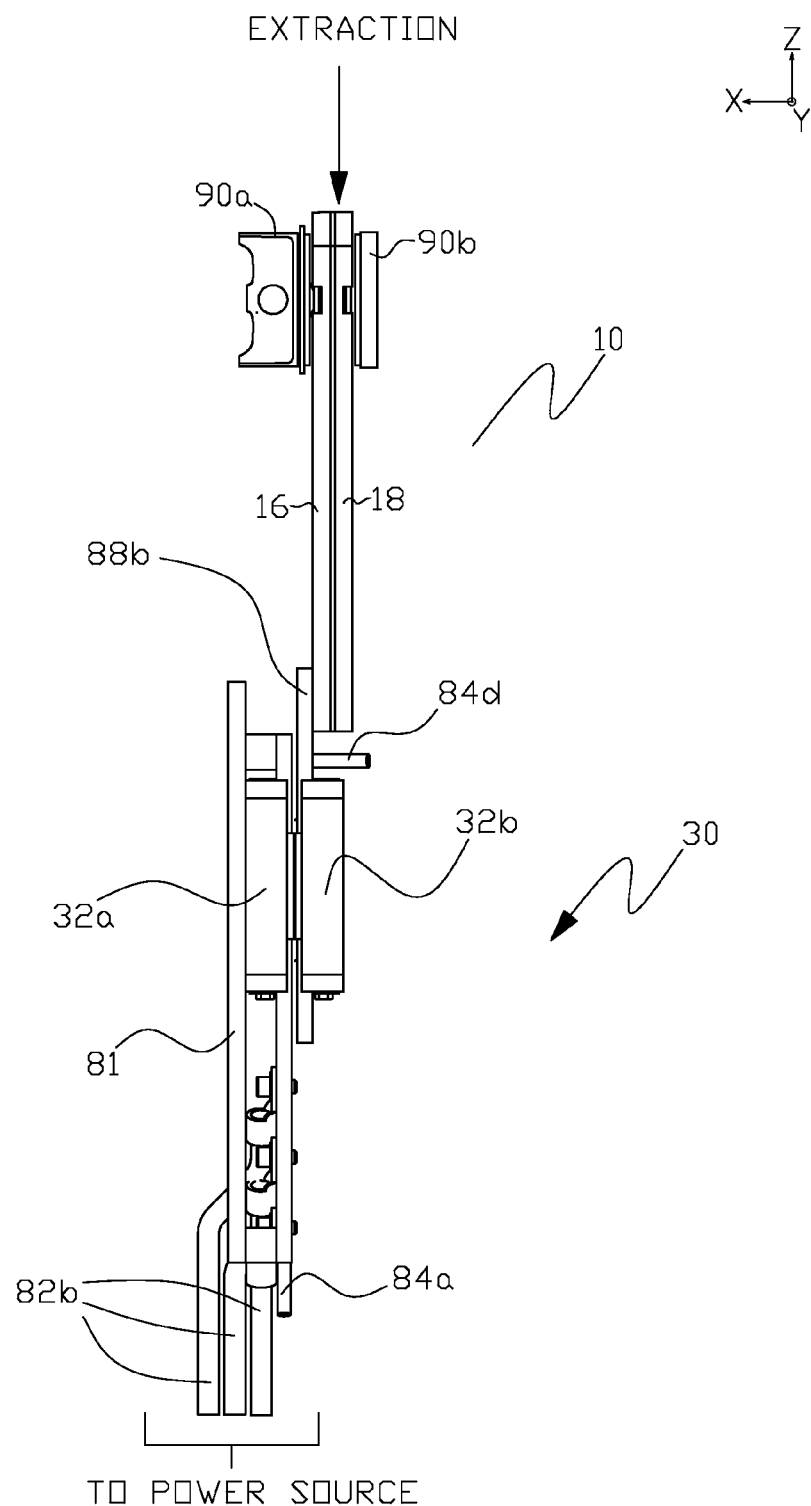
FIG. 14(e) is a side elevational view of the double-sided flat inductor assembly attached to the inductor extraction assembly shown in FIG. 14(a) with a first and second workpiece in the induction heating position.
Figure 15A:
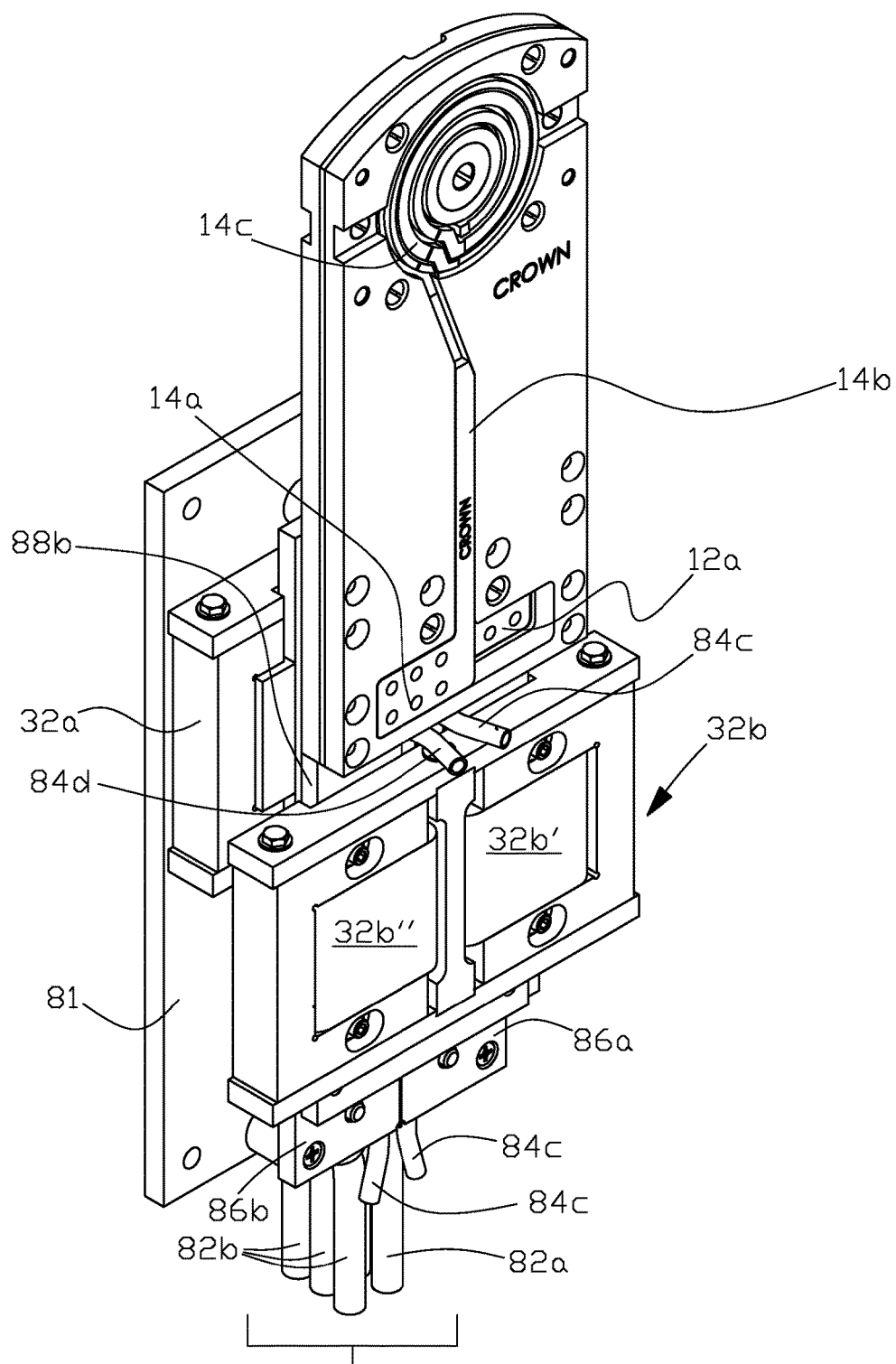
FIG. 15(a) is a front perspective view of a double-sided flat inductor assembly attached to one example of an inductor extraction assembly with the inductor and extraction assemblies in an induction post-heat extracted position.
Figure 15B:
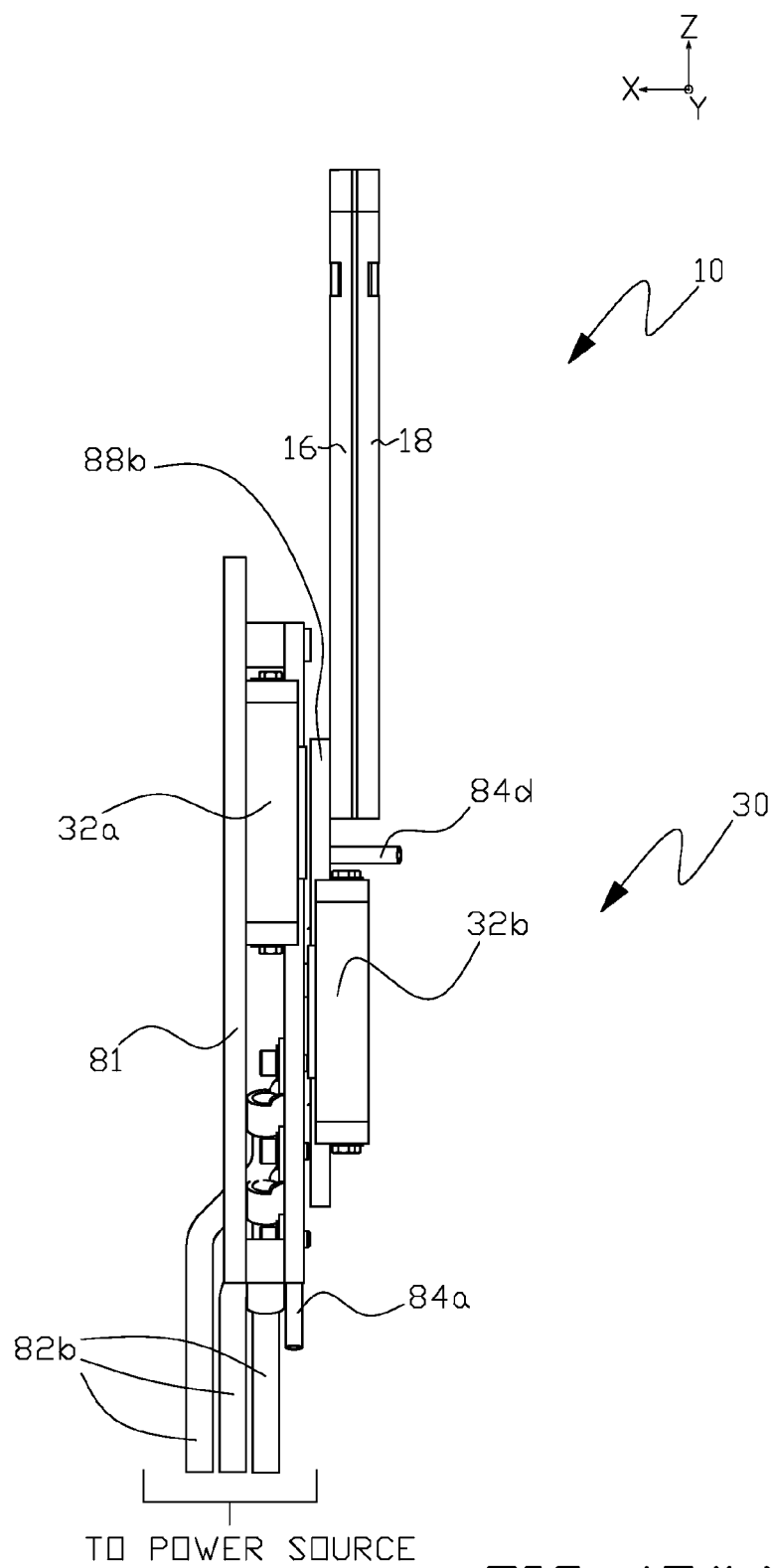
FIG. 15(b) is a side elevational view of the double-sided flat inductor assembly attached to the double-sided inductor extraction assembly shown in FIG. 15(a).
Figure 15C:
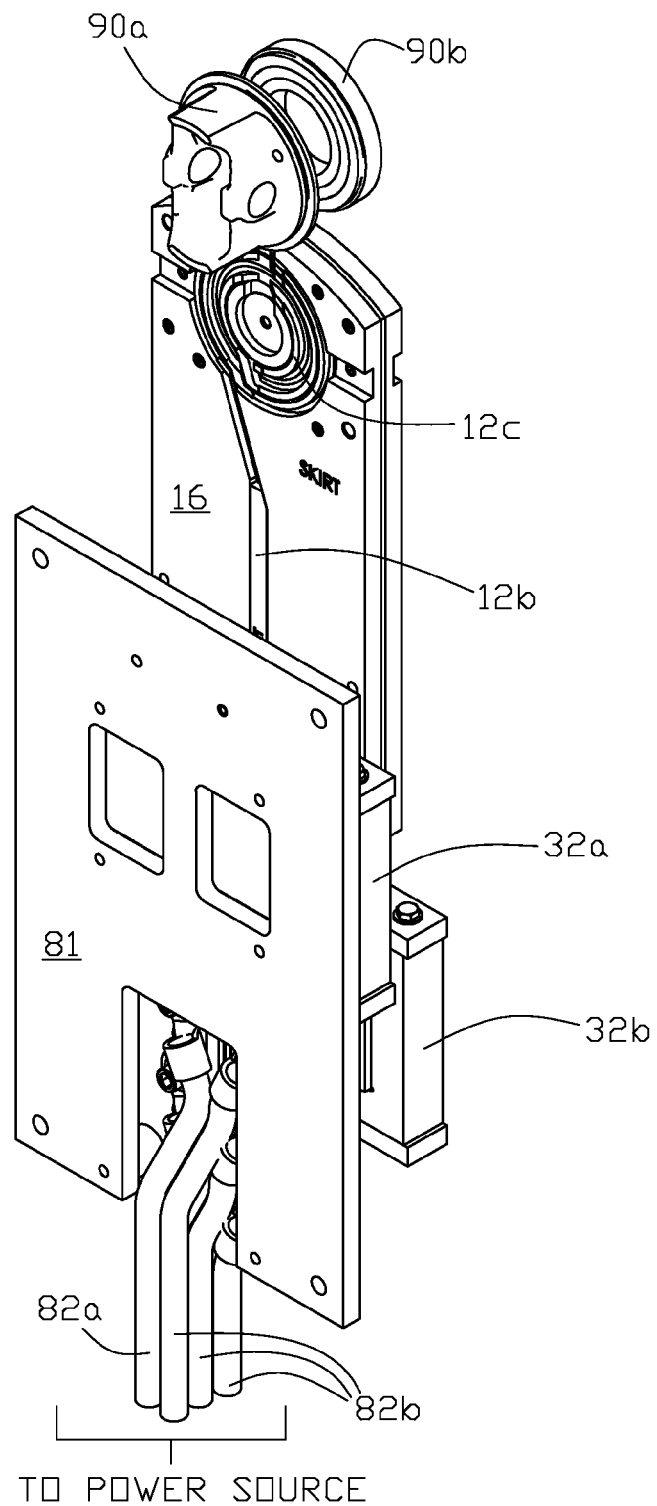
FIG. 15(c) is a rear perspective view of the double-sided flat inductor assembly attached to the double-sided inductor extraction assembly shown in FIG. 15(a) with a first and second workpieces.
Figure 15D:
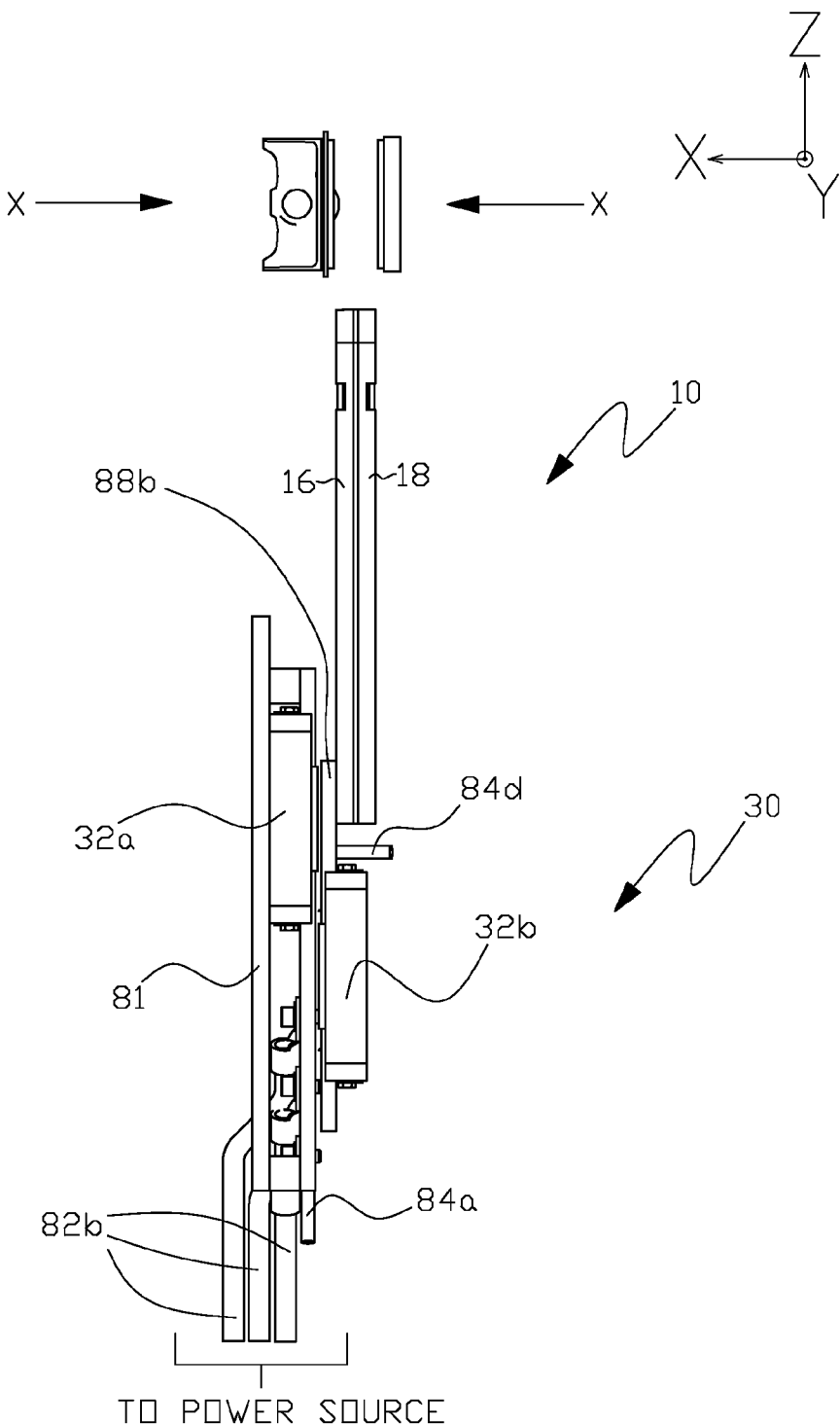
FIG. 15(d) is a side elevational view of the double-sided flat inductor assembly attached to the double-sided inductor extraction assembly shown in FIG. 15(a) with a first and second workpieces.

In FIG. 13(a) through FIG. 14(e) extraction assembly 30 and attached double-sided flat inductor assembly 10 are shown in the induction heating position with the workpieces in place for induction heating as shown in FIGS. 14(d) and 14(e) with the primary magnetic device aligned with the secondary magnetic device for flux transfer between the supply and return power magnetic devices and the inductor supply and return power magnetic devices. The inductor extraction actuator (not shown in the figures) moves the secondary magnetic device and secondary output electrical conductors with the attached double-sided flat inductor assembly 10 downwards to the inductor assembly (induction post-heat) extracted position where the double-sided flat inductor assembly does not interfere with mating of the two workpieces in an industrial process after being induction heated, for example, when moving the two workpieces together.

Figure 16:
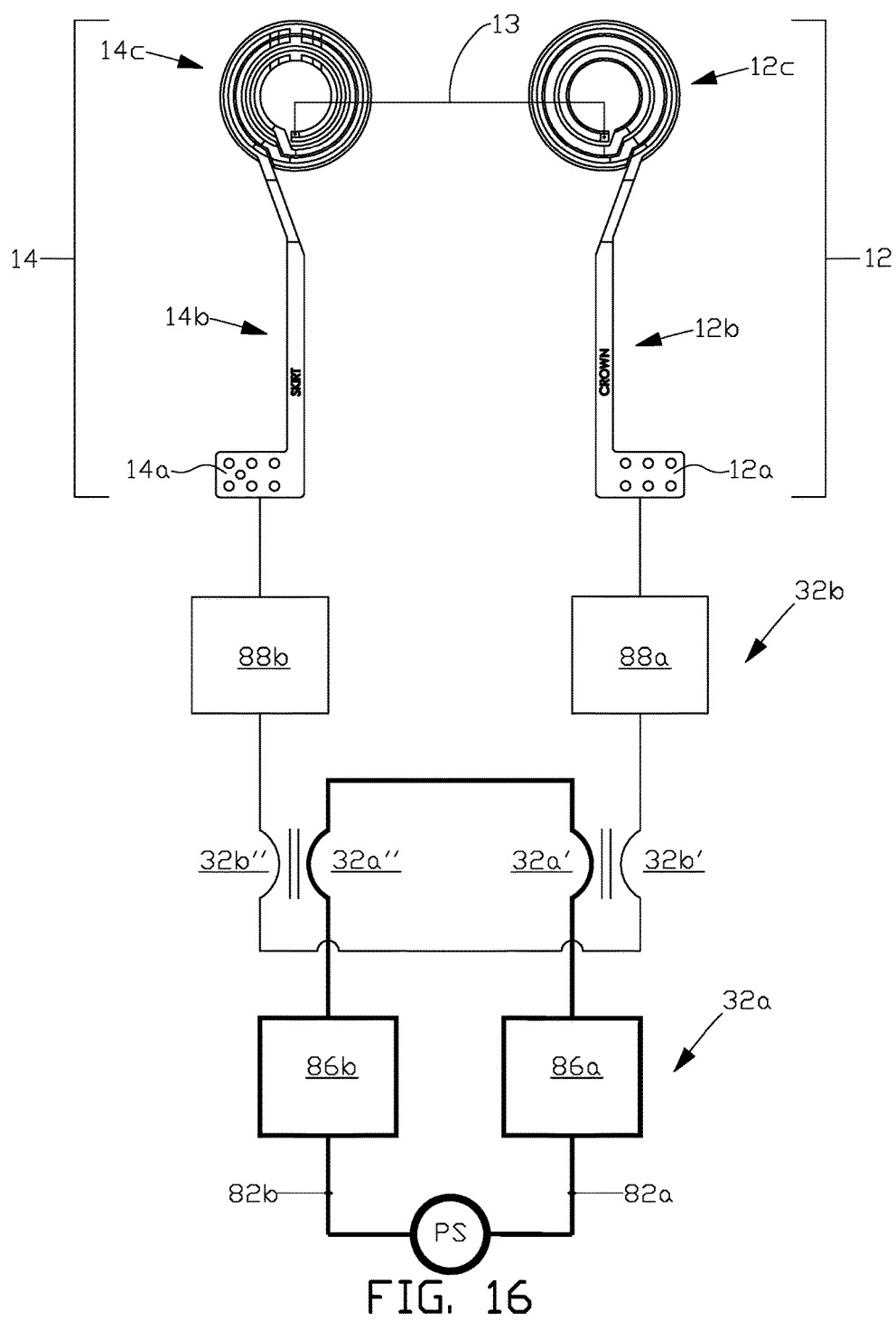
FIG. 16 is a diagrammatic electrical circuit representation for the embodiment of the double-sided inductor extraction assembly shown in the figures.

FIG. 16 is one example of an electrical circuit for the components of the double-sided inductor extraction assembly shown in the figures. In this embodiment the primary and secondary magnetic devices each comprise two electrically isolated magnetic devices. When the extraction assembly is in the induction heating position and alternating current is supplied via power source cables 82a and 82b the supply and return electrical circuit to the double-sided flat inductor assembly is completed by flux coupling between the primary magnetic devices and the secondary magnetic devices. When the extraction assembly 30 moves inductor assembly 10 to the induction post-heat extracted position there is no magnetic flux coupling between the primary magnetic devices and the secondary magnetic devices while the inductor assembly is clear of the space between the two induction heated workpieces. This method of inductor assembly extraction provides a high speed method of clearing the space between the two induction heated workpieces while electromagnetically disconnecting a supply of power to the inductor assembly in comparison with mechanical movement of an entire inductor assembly, including, for example, bus work and power cables connected to a power source. When extraction assembly 30 begins to transition inductor assembly 10 from the induction heating position to the inductor assembly (induction post-heat) extracted position, alternating current output power from power source PS in FIG. 16 could be turned off and the extracted inductors 12 and 14 on inductor assembly 10 would be powerless during the transition between the two positions.

If the first or second workpiece has one or more coil facing protrusions that would prevent retraction of the inductor assembly, a depressed coil region in a coil planar face, such as V-notches 99 shown in FIG. 1(a), FIG. 1(b) and FIG. 2 can be provided in the coil for clearance as the inductor retracts. Depending upon the arc length of the V-notch the workpiece facing the coil can be rotated in the induction heating position during heating to ensure that workpiece surface region facing a V-notch region are sufficiently heated. In the embodiment with a relatively short V-notch region, such as region 99, when the V-notch is less than 90 degrees, the circumferential component of the induced eddy current could provide a sufficient heating effect of the workpiece region that corresponds to the V-notch location, and therefore eliminating a need for workpiece rotation during heating.

In this example first inductor coil section 12c has profiled regions, for example, at the top of the coil that are profiled (contoured) regions 99' in the X-direction (that is, the height of the induction coil section). Regions 99' are raised above the normal face heating plane of coil section 12c on either side of V-notches 99 to compensate for low induced heat in the regions of the coil V-notches. Such profiling can be used to conform to the face of the coil section adjacent to the face of the workpiece being heated. In other examples of the invention the first and second coil sections may be of other shapes and contours to suit the shape of the corresponding first and second workpieces to heat each workpiece by proximity heating.

In this embodiment of the invention, in order to improve the heat uniformity in the transition regions 98 (FIG. 1(a) and FIG. 2) where there is a transition between the outer turn-to-middle turn and middle-turn-to-inner turn of the pair of three turn coils that provide simultaneous heating of the first and second workpieces, there are profiled regions 98'. In this example, regions 98' are profiled in the X-direction and raised above the normal face heating plane of the coil section to compensate for lower heat intensity due to a reduced heat generation.

In the above method electromagnetic coupling between primary magnetic device 32a and secondary magnetic device 32b allows the inductor to retract radially (Z-direction) away from the workpieces. For example, in this embodiment the secondary magnetic device may be slidably mounted adjacent to a stationary primary magnetic device so that the secondary magnetic device can be slid downwards relative to the primary magnetic device. There is no physical contact between the primary and secondary devices which allows the secondary half that forms an electrically closed-loop circuit, with the double-sided inductor attached, to be quickly extended to the induction heating position and retracted to the induction post-heat extraction position. This is diagrammatically illustrated in circuit FIG. 16 where the primary circuit is in bold and is connected to the non-bold secondary circuit when there is magnetic flux coupling between the primary and secondary magnetic devices. This motion allows the inductor assembly to be removed so that an industrial process, such as fusing the two workpieces together can occur in a fraction of a second after induction heating to minimize heat dissipation due to the combined effect of thermal conduction, thermal radiation and heat convection.

Each primary magnetic device can be any device that creates a magnetic flux from an alternating current flow through the device and each secondary magnetic device can be any device that magnetically couples the primary alternating magnetic flux for power transfer between the primary and secondary magnetic devices via transformer coupling without there being a physical connection between the primary magnetic devices and the secondary magnetic devices. For example in one embodiment of the invention each primary and secondary magnetic device can be two joined magnetic C-cores to form a rectangular closed magnetic core with a central opening in which a portion of electrical conductors 86a, 86b, 88a or 88b are placed so that when alternating current flows through primary supply electrical conductors 86a and 86b a magnetic flux field is created that couples with the corresponding secondary magnetic device when extraction assembly 30 has positioned the inductors in the inductor assembly in the induction heating position. Each primary and secondary magnetic device may also be referred to as a coil wound core.

The terms skirt and crown are used interchangeably herein with other pairs of workpieces where it is advantageous to simultaneously induction heat the two workpieces. Further the process following the simultaneous heating may be joining the opposing faces of the workpieces together, but is not limited to that process as long as the process can benefit from the simultaneous induction heating.

The extraction assembly of the present invention may be used with other configurations and quantity of inductors in an induction assembly in industrial processes where high speed transfer of the inductor assembly from an induction heating position to a workpiece non-interference position where the workpiece can be further processed is desirable.

While the described embodiment of the present example uses a pair of three turn coils in series in other embodiments the number of coil turns can be singular or any multiple number of turns. In other embodiments the number of coil turns may be different for each coil in the pair of coils.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A double-side inductor extraction assembly comprising:
 a stationary primary magnetic device (32a) mounted to a mounting structure, the stationary primary magnetic device (32a) having a supply primary magnetic device (32a') and a return primary magnetic device (32a");
 a secondary magnetic device (32b) having an inductor supply secondary magnetic device (32b') and an inductor return secondary magnetic device (32b"), the secondary magnetic device (32b) being electrically isolated from the stationary primary magnetic device (32a) and slidably mounted relative to the stationary primary magnetic device (32a) between:
  a heating position when the supply primary magnetic device (32a') is aligned with the inductor supply secondary magnetic device (32b'), and the return primary magnetic device (32a") is aligned with the inductor return secondary magnetic device (32b") and an alternating current source is supplied to the supply primary magnetic device (32a') and the return primary magnetic device (32a") to transfer flux respectively to the inductor supply secondary magnetic device (32b') and the inductor return secondary magnetic device (32b"); and
  a non-interference position when the supply primary magnetic device (32a') is not aligned with the inductor supply secondary magnetic device (32b') and the return primary magnetic device (32a") is not aligned with the inductor return secondary magnetic device (32b") to isolate the inductor supply secondary magnetic device (32b') and the inductor return secondary magnetic device (32b") from the alternating current source by sliding the secondary magnetic device (32b) relative to the stationary primary magnetic device (32a) to the non-interference position;
 an extraction assembly supply terminal (88a) connected to the inductor supply secondary magnetic device (32b'), the extraction assembly supply terminal (88a) configured for electrical connection to a first inductor terminal section;
 an extraction assembly return terminal (88b) connected to the inductor return secondary magnetic device (32b"), the extraction assembly return terminal (88b) configured for electrical connection to a second inductor terminal section; and
 an extraction actuator (33) connected to the secondary magnetic device (32b) for sliding the secondary magnetic device (32b) and the extraction assembly supply and return terminals (88a and 88b) between the heating position and the non-interference position.

2. The double-side inductor extraction assembly of claim 1 wherein each of the supply and return primary magnetic devices (32a' and 32a"), and each of the inductor supply and return secondary magnetic devices (32b' and 32b") comprise a separate coil wound core.

3. The double-side inductor extraction assembly of claim 1 wherein:
 the supply primary magnetic device (32a') comprises a supply power rectangular open magnetic core with a supply power electrical conductor disposed within the supply power rectangular open magnetic core, the supply power electrical conductor connected to a supply output of the alternating current source;
 the return primary magnetic device (32a") comprises a return power rectangular open magnetic core with a return power electrical conductor disposed within the return power rectangular open magnetic core, the return power electrical conductor connected to a return output of the alternating current source;
 the inductor supply secondary magnetic device (32b') comprises a supply inductor rectangular open magnetic core with an inductor supply electrical conductor disposed within the supply inductor rectangular open magnetic core, the inductor supply electrical conductor connected to the extraction assembly supply terminal (88a); and
 the inductor return secondary magnetic device (32b") comprises a return inductor rectangular open magnetic core with an inductor return electrical conductor disposed within the return inductor rectangular open magnetic core, the inductor return electrical conductor connected to the extraction assembly return terminal (88b).

4. The double-side inductor extraction assembly of claim 1 further comprising a supply electrical conductor and a return electrical conductor mounted to the mounting structure, the supply and return electrical conductors connecting the stationary primary magnetic device (32a) to the alternating current source.

5. The double-side inductor extraction assembly of claim 1 wherein the extraction actuator (33) is configured to linearly slide the secondary magnetic device (32b) and the extraction assembly supply and return terminals (88a and 88b) between the heating position and the non-interference position.

6. The double-side inductor extraction assembly of claim 1 further comprising at least one supply cable and at least one return cable for a respective supply and return of a cooling fluid medium to and from the double-side inductor extraction assembly.

7. A double-side inductor extraction assembly for a double-sided flat pair series-connected inductor assembly having a heating position and a non-interference position, the double-side inductor extraction assembly comprising:
 a stationary primary magnetic device (32a) mounted to a mounting structure, the stationary primary magnetic device (32a) having a supply primary magnetic device (32a') and a return primary magnetic device (32a");
 a secondary magnetic device (32b) having an inductor supply secondary magnetic device (32b') and an inductor return secondary magnetic device (32b"), the secondary magnetic device (32b) electrically isolated from the stationary primary magnetic device (32a) and slidably mounted adjacent to the stationary primary magnetic device (32a) for sliding movement between:
  the heating position when the supply primary magnetic device (32a') is aligned with the inductor supply secondary magnetic device (32b'), and the return primary magnetic device (32a") is aligned with the inductor return secondary magnetic device (32b") and an alternating current is supplied to the supply primary magnetic device (32a') and the return primary magnetic device (32a") to transfer flux respectively to the inductor supply secondary magnetic device (32b') and the inductor return secondary magnetic device (32b"); and
  the non-interference position when the supply primary magnetic device (32a') is not aligned with the inductor supply secondary magnetic device (32b') and the return primary magnetic device (32a") is not aligned with the inductor return secondary magnetic device (32b") by sliding the secondary magnetic device (32b) relative to the stationary primary magnetic device (32a) to isolate the inductor supply secondary magnetic device (32b') and the inductor return secondary magnetic device (32b") from the alternating current;
 an extraction assembly supply terminal (88a) connected to the inductor supply secondary magnetic device (32b'), the extraction assembly supply terminal commonly mounted with the secondary magnetic device (32b) and configured for electrical connection to a first inductor terminal section;
 an extraction assembly return terminal (88b) connected to the inductor return secondary magnetic device (32b"), the extraction assembly return terminal commonly mounted with the secondary magnetic device (32b) and configured for electrical connection to a second inductor terminal section; and
 an extraction actuator (33) connected to the secondary magnetic device (32b) for sliding the secondary magnetic device (32b) and the inductor extraction assembly supply and return terminals (88a and 88b) between the heating position and the non-interference position.

* * * * *